(12) United States Patent
Kondo et al.

(10) Patent No.: US 8,283,833 B2
(45) Date of Patent: Oct. 9, 2012

(54) ROTOR FOR ELECTRIC ROTARY MACHINE

(75) Inventors: Koji Kondo, Kiyosu (JP); Yoshinori Hayashi, Toyohashi (JP)

(73) Assignee: Denso Corporation, Kariya (JP)

( * ) Notice: Subject to any disclaimer, the term of this patent is extended or adjusted under 35 U.S.C. 154(b) by 338 days.

(21) Appl. No.: 12/588,757

(22) Filed: Oct. 27, 2009

(65) Prior Publication Data

US 2010/0109466 A1    May 6, 2010

(30) Foreign Application Priority Data

Oct. 31, 2008 (JP) ................................. 2008-281672
Dec. 5, 2008 (JP) ................................. 2008-310782

(51) Int. Cl.
*H02K 1/28* (2006.01)

(52) U.S. Cl. ............. 310/263; 310/156.12; 310/156.31; 310/156.72; 310/156.77

(58) Field of Classification Search ............. 310/156.12, 310/156.31, 156.33, 156.36–156.38, 156.45, 310/156.66, 156.72, 156.73, 156.77, 156.79, 310/263

See application file for complete search history.

(56) References Cited

U.S. PATENT DOCUMENTS

| | | | | |
|---|---|---|---|---|
| 5,539,265 A | * | 7/1996 | Harris et al. | 310/263 |
| 5,578,885 A | | 11/1996 | Alford et al. | |
| 5,793,144 A | * | 8/1998 | Kusase et al. | 310/263 |
| 5,828,155 A | | 10/1998 | Adachi et al. | |
| 5,907,209 A | * | 5/1999 | Ishida | 310/263 |
| 5,973,435 A | | 10/1999 | Irie et al. | |
| 6,104,118 A | * | 8/2000 | Kanazawa et al. | 310/263 |
| 6,426,581 B1 | * | 7/2002 | York et al. | 310/263 |
| 6,897,597 B1 | | 5/2005 | Armiroli et al. | |
| 7,211,922 B2 | * | 5/2007 | Isoda et al. | 310/263 |
| 7,545,074 B2 | * | 6/2009 | Maekawa et al. | 310/263 |
| 2002/0011757 A1 | | 1/2002 | Tanaka et al. | |
| 2002/0117934 A1 | | 8/2002 | Kanazawa et al. | |
| 2004/0178696 A1 | | 9/2004 | Tajima et al. | |
| 2005/0110358 A1 | | 5/2005 | Maeda et al. | |
| 2008/0048516 A1 | | 2/2008 | Oowatari et al. | |

FOREIGN PATENT DOCUMENTS

| | | |
|---|---|---|
| JP | U-55-086385 | 6/1980 |
| JP | A-03-265450 | 11/1991 |
| JP | U-5-9011 | 2/1993 |

(Continued)

OTHER PUBLICATIONS

Japanese Office Action issued in Application No. 2008-310782; dated Oct. 12, 2010 (with translation).

(Continued)

*Primary Examiner* — Quyen Leung
*Assistant Examiner* — Naishadh Desai
(74) *Attorney, Agent, or Firm* — Oliff & Berridge, PLC

(57) ABSTRACT

A rotor for an electric rotary machine and a method of manufacturing the same are disclosed wherein none of permanent magnets is fixed to a magnetic supporting segment of a magnet support ring in advance and each permanent magnet is assembled separately of the magnet support ring. Prior to the assembling of the permanent magnets, the magnet support ring is preliminarily located on claw-shaped magnetic poles at inner peripheral sides thereof under a state combined with a pair of field iron cores, after which the permanent magnets are inserted to magnet insertion spaces in longitudinal directions. The rotor includes positioning and restricting means for precluding the occurrence of positional displacement of each permanent magnet with respect to each magnet supporting segment of the magnet support ring.

3 Claims, 23 Drawing Sheets

FOREIGN PATENT DOCUMENTS

| | | |
|---|---|---|
| JP | A-08-223882 | 8/1996 |
| JP | A-09-163700 | 6/1997 |
| JP | A-10-313559 | 11/1998 |
| JP | A-11-318064 | 11/1999 |
| JP | A-2000-134888 | 5/2000 |
| JP | A-2002-44921 | 2/2002 |
| JP | A-2002-262530 | 9/2002 |
| JP | A-2004-007958 | 1/2004 |
| JP | A-2004-190699 | 7/2004 |
| JP | A-2005-80472 | 3/2005 |
| JP | A-2005-160172 | 6/2005 |
| JP | A-2008-54392 | 3/2008 |

OTHER PUBLICATIONS

Office Action dated Aug. 31, 2010 in Japanese Patent Application No. 2008-281672 (with translation).

* cited by examiner

ROTOR FOR ELECTRIC ROTARY MACHINE

CROSS REFERENCE TO RELATED APPLICATIONS

This application is related to Japanese Patent Application Nos. 2008-281672 and 2008-310782 filed on Oct. 31, 2008 and Dec. 5, 2008, respectively, the contents of which are hereby incorporated by reference.

BACKGROUND OF THE INVENTION

1. Technical Field of the Invention

The present invention relates to rotors for electric rotary machines and, more particularly, to a rotor for an electric rotary machine having permanent magnets each disposed between adjacent claw-shaped magnet poles formed on a pair of field iron cores.

2. Description of the Related Art

In the related art, a technology, disclosed in, for instance, Patent Publication 1 (Japanese Patent Application Publication No. H08-223882), has heretofore been known as an alternator for an automotive vehicle or the like. With such a structure of the related art, a technology has been proposed contemplating the provision of a pair of Lundell type pole cores formed with claw-shaped magnet poles held in meshing engagement with each other with given clearances in which permanent magnets are inserted, respectively. This results in a reduction in leakage of fluxes between circumferentially adjacent claw-shaped magnet poles with a resultant increase in the amount of magnetic fluxes effective contributing to an effect of generating electric power, thereby achieving improved output.

With the related art structure mentioned above, further, each of the claw-shaped magnet poles has circumferentially spaced sidewalls whose outer peripheral portions are formed with flanged engaging stop portions extending in a circumferential direction. Each of the permanent magnets has outer peripheral shoulder portions held in abutting engagement with inner peripheries of the flanged engaging stop portions of the adjacent claw-shaped magnet poles. This restricts the permanent magnets from flying out of their assembled positions in a centrifugal direction (in a radially outward direction) during the rotation of the rotor.

Further, a support ring, made of non-magnetic material, has an outer circumferential surface to which a plurality of permanent magnets are fixedly secured by means of adhesive or the like to be structured as a magnet assembly, which in turn is assembled to the pole cores.

With the related art technology disclosed in Patent Publication 1, however, since the plurality of permanent magnets are fixedly secured to the support ring on the outer circumferential surface thereof by means of adhesive or the like, there is a need for component parts with extremely high precisions and increased assembling precision. That is, when placed in the magnet assembly, the plurality of permanent magnets are preliminarily fixedly secured in position with respect to the support ring. Under such a condition, if the permanent magnet is dislocated from a correct position in some degree, then, undue stress occurs on the permanent magnet when inserting the permanent magnet into the space between the circumferentially adjacent claw-shaped magnet poles or during use of the rotor, potentially resulting in damage to the permanent magnet.

Furthermore, even if the magnet assembly has high precision (i.e., increased positional precision of the permanent magnet with respect to the support ring), it is likely that a variation takes place in machining precisions of the claw-shaped magnetic poles. In this case, even if airspace (hereinafter referred to as a "magnet insertion space") can be ensured enabling the permanent magnet to be inserted between the circumferentially adjacent claw-shaped magnet poles with the pair of pole cores being assembled, there is a likelihood that a deviation occurs between the magnet insertion space and the permanent magnet fixedly secured onto the support ring. This can cause a difficulty to arise in inserting the permanent magnet into the magnet insertion space.

With such a structure disclosed in Patent Publication 1 as set forth above, in order to allow a plurality of permanent magnets, fixedly secured onto the support ring, to be inserted to the magnet insertion spaces in multiple locations with no problem, not only the pole cores need to have increased part precisions (especially the claw-shaped magnetic poles need to have increased machining precisions) and assembling precision but also the magnet assembly needs to have increased precision. This results in a cause of an increase in production cost.

SUMMARY OF THE INVENTION

The present invention has been completed with a view to addressing the above issues and has an object to provide a rotor for an electric rotary machine that can prevent the occurrence of damages to permanent magnets with a structure at low cost in which no undue force acts on the permanent magnets, resulting in a cause of an increase in production cost.

(First Aspect of the Invention)

To achieve the above object, a first aspect of the present invention provides a rotor for an electric rotary machine comprising: a pair of field iron cores fixed to a rotary shaft and having pluralities of claw-shaped magnetic poles meshing with each other with a given distance between circumferentially adjacent claw-shaped magnetic poles in a circumferential direction of the rotor, each of the claw-shaped magnetic poles having circumferentially facing side walls with outer circumferential portions formed with engaging stop portions circumferentially protruding in flanged shapes, respectively; a field winding wound on the pair of field iron cores; a plurality of permanent magnets each disposed between sidewalls of the circumferentially adjacent claw-shaped magnetic poles and magnetized in a direction to reduce leakage of magnetic flux between the circumferentially adjacent claw-shaped magnetic poles; and a non-magnetic magnet support ring disposed on the plurality of permanent magnets on inner peripheral sides thereof. The magnet support ring includes support means for supporting the permanent magnets to allow each permanent magnet to be disposed between the sidewalls of the circumferentially adjacent claw-shaped magnetic poles. Further, the magnet support ring is disposed on the claw-shaped magnetic poles on the inner peripheral sides thereof in a situation where the inner peripheral sides of the permanent magnets are supported with the magnet support ring. This allows the engaging stop portions of the circumferentially adjacent claw-shaped magnetic poles to restrict each permanent magnet from moving radially outward.

With such a structure, none of the plural permanent magnets is fixedly secured to the support ring, and the plural permanent magnets and the support ring can be separately assembled to the pair of field iron cores. In particular, the support ring is preliminarily placed on the inner peripheral sides of the claw-shaped magnetic poles, formed on the pair of field iron cores, after which the plural permanent magnets are inserted each between the circumferentially adjacent claw-shaped magnetic poles for assembly. Thus, even if variation takes place in machining precisions of the claw-shaped magnetic poles and assembling precisions thereof, no undue force acts on the permanent magnets, thereby preventing damages to the permanent magnets during assembly and in use or the like. In contrast to the related art technology (disclosed in Patent Publication 1) in which the plural permanent magnets are fixedly secured to the support ring in advance, the present invention has advantageous effects. That is, with the present invention, no need arises to form the magnet assembly, thereby making it unnecessary to determine the positional relationship between the plural permanent magnets and the support ring with increased precision. In addition, no need arises for the field iron cores to have increased part precision and assembling precision, thereby achieving a reduction of production cost by that extent.

(Second Aspect of the Invention)

With the rotor for the electric rotary machine according to the first aspect of the present invention, the permanent magnets may be accommodated in magnet insertion spaces, respectively, each of which is defined with a radial spacing between each of the engaging stop portions formed on the claw-shaped magnetic poles, respectively, and the magnet support ring and a circumferential dimension between the sidewalls of the circumferentially adjacent claw-shaped magnetic poles. In addition, the magnet support ring may be located on inner peripheral sides of the claw-shaped magnetic poles to allow the permanent magnets to be accommodated in the magnet insertion spaces, respectively.

With such a structure, locating the magnet support ring on the inner peripheral sides of the claw-shaped magnetic poles formed on the pair of field iron cores allows the magnet insertion spaces to be defined for permitting the permanent magnets to be accommodated in the magnet insertion spaces, respectively. That is, none of the permanent magnets is fixedly attached to the magnet support ring and only the permanent magnets can be inserted to the magnet insertion spaces, respectively, for assembly.

(Third Aspect of the Invention)

With the rotor for the electric rotary machine according to the first aspect of the present invention, the magnet support ring may preferably include a plurality of circumferentially and equidistantly spaced magnet supporting segments for supporting the plurality of the permanent magnets, respectively, and a plurality of interconnecting segments for interconnecting the plurality of the magnet supporting segments to each other in an annular shape. Each of the magnet supporting segments may preferably have an axial length, extending in line with a longitudinal direction of each permanent magnet, which is longer than a circumferential width of each of the interconnecting segments.

With such a structure, increasing the length of the magnet supporting segment to be greater than the width of each interconnecting segment enables the permanent magnet to be pressed against the engaging stop portions of the circumferentially adjacent claw-shaped magnetic poles in a stable fashion. Thus, the rotor can be assembled with increased reliability against centrifugal force.

(Fourth Aspect of the Invention)

With the rotor for the electric rotary machine according to the third aspect of the present invention, the magnet supporting segments may preferably have surfaces, on which the permanent magnets are supported, which are formed in flat surfaces, respectively.

For instance, if each magnet supporting segment has a circular arc shape with the same radius of curvature as that of each interconnecting segment, it becomes difficult to bring each magnet supporting segment into contact with the relevant permanent magnet on a flat plane, resulting in a decrease contact surface area between each magnet supporting segment and each permanent magnet. On the contrary, with the present invention, each magnet supporting segment is shaped in a flat surface, thereby enabling each magnet supporting segment and each permanent magnet to be brought into contact with each other with an increased abutting surface area. As a result, the permanent magnets can be fixed in place in a highly reliable manner, thereby permitting the permanent magnets and the magnet supporting segments to be held in abutting surfaces each with a reduced surface pressure. This results in an increase in reliability of the magnet support ring and the permanent magnets.

(Fifth Aspect of the Invention)

With the rotor for the electric rotary machine according to the third aspect of the present invention, the magnet supporting segments may preferably have shapes and surface areas nearly equal to shapes and surface areas of the inner peripheral surfaces of the permanent magnet supported with the magnet supporting segments, respectively.

In such a case, even if the magnet supporting segment has an increasing surface area more than necessary, the permanent magnet can be stably fixed to the magnet supporting segment, resulting in a further increase in fixing reliability of the permanent magnet.

(Sixth Aspect of the Invention)

With the rotor for the electric rotary machine according to the third aspect of the present invention, each of the magnet supporting segments may preferably have axial ends at least one of which has a guide portion folded radially inward.

With the magnet supporting segments having the end portions formed with the guide portions, respectively, no corners of the permanent magnets are liable to hit the end portions of the magnet supporting segments, respectively, during work of assembling the permanent magnets, enabling assembling work to be easily done.

Further, the guided portions may be formed on both ends of each magnet supporting segment. In an alternative, if the permanent magnets are assembled only in one specified direction, then, one guide portion may be formed on either one of the ends of each magnet supporting segment.

(Seventh Aspect of the Invention)

With the rotor for the electric rotary machine according to the third aspect of the present invention, the magnet support ring may preferably support the permanent magnets with the inner peripheral surfaces held in abutting engagement with the magnet supporting segments, respectively, under which shoulder portions, formed on an outer peripheral wall of each permanent magnet, are held in abutting engagement with inner peripheral surfaces of the engaging stop portions of the circumferentially adjacent claw-shaped magnetic poles to restrict each permanent magnet from moving radially outward.

In such a case, each permanent magnet is inserted to the magnet insertion space with a slight amount of tightening margin in a radial spacing between the engaging stop portions of the circumferentially adjacent claw-shaped magnetic poles and the magnet support ring. This allows the permanent magnet to be brought into abutting engagement with both of the circumferentially adjacent claw-shaped magnetic poles and the magnet support ring, ensuring the fixing of the permanent magnet with a capability of withstanding centrifugal stress.

(Eighth Aspect of the Invention)

With the rotor for the electric rotary machine according to the seventh aspect of the present invention, the support means may further preferably include an impregnant filled in a space between a circumferentially facing sidewall of each permanent magnet and a sidewall of each claw-shaped magnetic pole.

With each permanent magnet formed in shape to have a circumferential width dimension slightly less than a circumferential between the sidewalls of the circumferentially adjacent claw-shaped magnetic poles, no undue force acts on each permanent magnet when inserting the permanent magnet in a space between the sidewalls of the circumferentially adjacent claw-shaped magnetic poles. This makes it possible to prevent the occurrence of cracking or damage to the permanent magnet. In this case, there is a clearance between the sidewall of each permanent magnet and the sidewall of the neighboring claw-shaped magnetic pole and, hence, the clearance is buried with impregnant (such as, for instance, epoxy resin). This prevents the permanent magnet from moving in a circumferential direction. Thus, the permanent magnet can be fixed with increased reliability due to a capability of retaining the permanent magnet in a further stable fashion.

(Ninth Aspect of the Invention)

With the rotor for the electric rotary machine according to the third aspect of the present invention, the support means may further preferably include an impregnant filled in a space between each permanent magnet and each of the magnet supporting segments and a space between each permanent magnet and a sidewall of each claw-shaped magnetic pole.

With such a structure, the application of impregnant (such as, for instance, epoxy resin) results in a capability of retaining each permanent magnet with a further stabilized effect, thereby providing increased fixing reliability of the permanent magnet.

(Tenth Aspect of the Invention)

With the rotor for the electric rotary machine according to the first aspect of the present invention, each permanent magnet may preferably have an outer peripheral wall, facing radially outward, at least a part of which is surrounded with a non-magnetic material.

With such a structure, the rotor magnets can have increased strength against centrifugal force with resultant increase in reliability.

(Eleventh Aspect of the Invention)

With the rotor for the electric rotary machine according to the tenth aspect of the present invention, each of the permanent magnets may be preferably accommodated in a holder made of the non-magnetic material and formed in a box shape.

With such a structure, an entire surface of each permanent magnet can be surrounded with the holder. Thus, no likelihood occurs for the permanent magnet to be brought into direct abutment with the claw-shaped magnetic pole and the magnet support ring during assembling of the permanent magnets, thereby preventing the occurrence of damage to the permanent magnet.

Further, the rotor can have increased magnet strength against centrifugal stress. If by any chance the permanent magnet is damaged, it becomes possible to prevent fractures of the permanent magnet from scattering.

(Twelfth Aspect of the Invention]

The rotor for the electric rotary machine according to the first aspect of the present invention may further preferably comprise positional displacement restricting means provided on the magnet support ring for restricting a positional displacement of each permanent magnet with respect to the magnet support ring in a longitudinal direction thereof along the sidewalls of each claw-shaped magnetic pole.

With such a structure, none of the permanent magnets are fixedly attached to the magnet supporting segments of the magnet support ring, respectively. For instance, the magnet support ring is preliminarily located on the inner peripheral sides of the claw-shaped magnetic poles formed on the pair of field iron cores, respectively, after which the permanent magnets can be inserted to the areas each between the circumferentially adjacent claw-shaped magnetic poles for assembly. Thus, even if a variation occurs in machining precision and assembling precision of the claw-shaped magnetic poles, no undue force acts on the permanent magnets, thereby preventing damages to the permanent magnets during assembly or in use.

Further, locating the permanent magnets in the spaces each between the circumferentially adjacent claw-shaped magnetic poles restricts the movement of each permanent magnet from moving in a rotational direction of the rotor. In addition, the flanged portions of the claw-shaped magnetic poles restrict the permanent magnets from moving in a centrifugal direction. Moreover, the magnet support ring, placed on the permanent magnets at the inner peripheral sides thereof, restricts the permanent magnets from moving in a radially inward direction. Besides, the positional restricting means of the present invention restricts the positional displacements of the permanent magnets in longitudinal directions thereof with respect to the magnet support ring. This results in an increase in fixing reliability of the permanent magnets, while reliably preventing movement of the permanent magnets due to engine vibration or the like.

(Thirteenth Aspect of the Invention]

With the rotor for the electric rotary machine according to the twelfth aspect of the present invention, the positional displacement restricting means may preferably include one of a concaved portion and an apertured portion formed on at least one of the magnet support ring and each permanent magnet and a convexed portion formed on the other one of the magnet support ring and each permanent magnet, the convexed portion being held in fitting engagement with the one of the concaved portion and the apertured portion.

With such a structure, the fitting engagement between the concaved portion or the apertured portion and the convexed portion results in the realization of the positional displacement restricting means with a simplified structure.

(Fourteenth Aspect of the Invention]

With the rotor for the electric rotary machine according to the twelfth aspect of the present invention, the magnet support ring may preferably include a plurality of circumferentially and equidistantly spaced magnet supporting segments for supporting the plurality of the permanent magnets, respectively, and a plurality of interconnecting segments for interconnecting the plurality of the magnet supporting segments to each other in an annular shape. Each of the magnet supporting segments may preferably have axial ends formed with engaging stop segments bent radially outward in a pair to grasp each permanent magnet in a longitudinal direction thereof for thereby forming the positional deviation restricting means.

With such a structure, the pair of engaging stop segments formed on the magnet support ring can grasp each permanent magnet in a longitudinal direction thereof, thereby reliably preventing the positional displacement of the permanent magnet in the longitudinal direction thereof with respect to the magnet support ring. Further, it may be possible to use an assembling sequence to assemble the permanent magnets as described below. That is, during work to assemble the magnet support ring to the field iron cores, either one of the pair of the stop engaging segments is bent in advance, after which the permanent magnet is inserted to the space between the magnet support ring and the flanged portions of the claw-shaped magnetic poles. Thereafter, the remaining one of the pair of the stop engaging segments is folded. With such an assembling sequence, no stress acts on each permanent magnet when inserting each permanent magnet into the space between the magnetic support ring and the flanged portions of the claw-shaped magnetic poles, resulting in an increase in reliability of the pair of engaging stop segments grasping the permanent magnet in the longitudinal direction thereof.

(Fifteenth Aspect of the Invention]

With the rotor for the electric rotary machine according to the twelfth aspect of the present invention, the magnet support ring may preferably support a radially facing inner peripheral wall of each permanent magnet and have an elasticity to allow both shoulder portions, formed at a radially facing outer peripheral wall of each permanent magnet, to be pressed against inner peripheral surfaces of the engaging stop portions of circumferentially adjacent ones of the claw-shaped magnetic poles during assembly.

With such a structure, each permanent magnet is assembled to the space between the flanged portions of the claw-shaped magnetic poles and the magnetic support ring with a slight amount of tightening margin with respect to a radial direction of the rotor. This allows the permanent magnet to have the inner peripheral wall, supported with the magnetic support ring, and the outer peripheral wall with both shoulder portions pressed against the inner peripheral walls of the flanged portions of the claw-shaped magnetic poles. This allows the permanent magnet to be fixed with further increased reliability to withstand centrifugal stress, resulting in increased fixing reliability.

(Sixteenth Aspect of the Invention]

With the rotor for the electric rotary machine according to the twelfth aspect of the present invention, each of the permanent magnets may preferably include a non-magnetic magnet case protecting at least an inner peripheral surface of each permanent magnet. The magnet support ring may preferably include an annular body made of non-magnetic material for supporting the permanent magnets on the inner peripheral sides thereof via the magnet case.

With such a structure, none of the plural permanent magnets is fixedly attached to the magnet support ring via the magnet case. Therefore, the magnet support ring is preliminarily located on the inner peripheral sides of the claw-shaped magnetic poles formed on the pair of field iron cores. Subsequently, each permanent magnet, retained with the magnet case, can be inserted to the space between the sidewalls of the circumferentially adjacent claw-shaped magnetic poles for assembly. Thus, even if a variation occurs in machining precision and assembling precision of the claw-shaped magnetic poles, no undue force acts on each permanent magnet, thereby preventing damage to the permanent magnet during assembly or in use.

Further, locating the permanent magnet between the circumferentially adjacent claw-shaped magnetic poles results in an effect of restricting the permanent magnet from moving in the rotational direction. Also, the flanged portions of the claw-shaped magnetic poles restrict the movement of the permanent magnet in the centrifugal direction. Moreover, the magnet support ring, placed on the magnet case at the inner peripheral wall, restricts the movement of the permanent magnet in the radially inward direction. In addition, the positional displacement restricting means of the present invention enables the magnet support ring to restrict the positional displacement of the permanent magnet via the magnet case in the longitudinal direction. This results in an increase in fixing reliability of the permanent magnet, while reliably preventing the movement of the permanent magnet due to the engine vibration or the like.

(Seventeenth Aspect of the Invention]

With the rotor for the electric rotary machine according to the sixteenth aspect of the present invention, the magnet case may preferably have a pair of end plate portions held in contact with both axial ends of each permanent magnet for protecting the both axial ends of each permanent magnet in the longitudinal direction thereof. The magnet support ring may preferably have a plurality of circumferentially and equidistantly spaced magnet supporting segments to support the permanent magnets, respectively, and each of the magnet supporting segments has both axial ends, aligned along the longitudinal direction of each permanent magnet, at which engaging stop segments are folded in pairs toward the end plate portions of the magnet case to grasp the magnet case along a longitudinal direction thereof to act as the positional displacement restricting means.

With such a structure set forth above, causing the pair of engaging stop segments, formed on the magnet support ring, to grasp the permanent magnet in the longitudinal direction thereof reliably prevents the positional displacement of the permanent magnet in the longitudinal direction thereof with respect to the magnet support ring. Further, it may be possible to use an assembling sequence to assembly the permanent magnets as described below. That is, during work to assemble the magnet support ring to the field iron cores, either one of the pair of the stop engaging segments is bent in advance, after which the permanent magnet, held with the magnet case, is inserted to the space between the magnet support ring and the flanged portions of the claw-shaped magnetic poles. Thereafter, the remaining one of the pair of the stop engaging segments is folded. With such an assembling sequence, no stress acts on each permanent magnet when inserting each permanent magnet into the space between the magnetic support ring and the flanged portions of the claw-shaped magnetic poles, resulting in an increase in reliability of the pair of engaging stop segments grasping the permanent magnet in the longitudinal direction thereof.

(Eighteenth Aspect of the Invention]

With the rotor for the electric rotary machine according to the sixteenth aspect of the present invention, the positional displacement restricting means may preferably include a snap fit formed on the magnet case to engage the magnet support ring along the longitudinal direction of each permanent magnet.

With such a structure, the snap fit, formed on the magnet case, can easily restrict the positional displacement of the permanent magnet in the longitudinal direction thereof with respect to the magnet support ring.

(Nineteenth Aspect of the Invention]

With the rotor for the electric rotary machine according to the sixteenth aspect of the present invention, a radially facing inner peripheral wall of each permanent magnet may be preferably supported on the magnet support ring via the magnet case. The magnet support ring may preferably have an elasticity to allow both shoulder portions, formed at a radially facing outer peripheral wall of each permanent magnet, to be pressed against inner peripheral surfaces of the engaging stop portions of circumferentially adjacent ones of the claw-shaped magnetic poles during assembly.

With such a structure, the permanent magnet and the magnet case can be assembled to the space between the flanged portions of the claw-shaped magnetic poles and the magnetic support ring with a slight amount of tightening margin with respect to the radial direction of the rotor. This allows the inner peripheral wall per se of the permanent magnet to be supported on the magnet support ring via the magnet case with the outer peripheral wall having the shoulder portions pressed against the inner peripheral walls of the flanged portions of the claw-shaped magnetic poles. This results in further increased reliability of fixing the permanent magnet with an effect of withstanding centrifugal stress, providing improved fixing reliability.

(Twentieth Aspect of the Invention)

With the rotor for the electric rotary machine according to the sixteenth aspect of the present invention, the magnet case may preferably have a box shape, surrounding a whole surface of each permanent magnet, which has an inner peripheral case surface supported on the magnet support ring so as to protect the inner peripheral surface of each permanent magnet. The magnet support ring may preferably have an elasticity to allow both shoulder portions, formed at a radially facing outer peripheral wall of each permanent magnet, to be pressed against inner peripheral surfaces of the engaging stop portions of circumferentially adjacent ones of the claw-shaped magnetic poles during assembly.

With such a structure, a whole surface of the permanent magnet is encompassed in the magnet case and there is no risk of the permanent magnet directly hitting the claw-shaped magnetic poles and the magnet support ring during assembly of the permanent magnet, thereby preventing damage to the permanent magnet. Further, the magnet case is assembled to the circumferentially adjacent claw-shaped magnetic poles with both shoulder portions of the magnet case at the outer peripheral side thereof being pressed against the inner peripheral walls of the flanged portions the circumferentially adjacent claw-shaped magnetic poles. This results in an increase in fixing reliability against centrifugal force. In any case, even if the permanent magnet is damaged, the magnet case can prevent the scattering of fragments of the permanent magnet.

(Twenty-First Aspect of the Invention)

With the rotor for the electric rotary machine according to the sixteenth aspect of the present invention, the magnet support ring may preferably include an impregnant filled in a space between a circumferentially facing case surface of the magnet case and a circumferentially facing sidewall of each claw-shaped magnetic pole.

There is likelihood that the clearance is created between a circumferentially facing sidewall of the magnet case and a circumferentially facing sidewall of each claw-shaped magnetic pole. Burying such clearance with impregnant (such as, for instance, epoxy resin) enables the permanent magnet, encompassed in the magnet case, to be retained in a further stabilized state, resulting in an increase in fixing reliability of the permanent magnet.

(Twenty-Second Aspect of the Invention)

With the rotor for the electric rotary machine according to the sixteenth aspect of the present invention, the magnet support ring may preferably include an impregnant filled in a space between the magnet case and each claw-shaped magnetic pole and a space between the magnet case and a sidewall of the magnet support ring.

There is likelihood that the clearance is created between the magnet case and the magnet support ring. Burying such clearance with impregnant (such as, for instance, epoxy resin) enables the magnet case to retain the permanent magnet, encompassed in the magnet case, in a further stabilized state, resulting in an increase in fixing reliability of the permanent magnet.

(Twenty-Third Aspect of the Invention)

With the rotor for the electric rotary machine according to the sixteenth aspect of the present invention, the magnet support ring may preferably include an impregnant filled in spaces between the magnet case and each permanent magnet and between each claw-shaped magnetic pole and the magnet support ring.

There is likelihood that the clearances are created between the magnet case and each permanent magnet and between each claw-shaped magnetic pole and the magnet support ring. Burying such clearances with impregnant (such as, for instance, epoxy resin) enables the magnet case and the permanent magnet to be retained in a further stabilized state, resulting in an increase in fixing reliability of the permanent magnet.

(Twenty-Fourth Aspect of the Invention)

According to a twenty-fourth aspect of the present invention, there is provided a method of manufacturing a rotor for an electric rotary machine, the method comprising: preparing a pair of field iron cores fixed to a rotary shaft and having pluralities of claw-shaped magnetic poles meshing with each other with a given distance between circumferentially adjacent claw-shaped magnetic poles in a circumferential direction of the rotor, each of the claw-shaped magnetic poles having circumferentially facing side walls with outer circumferential portions formed with engaging stop portions circumferentially protruding in flanged shapes, respectively; preparing a field winding wound on the pair of field iron cores; preparing a plurality of permanent magnets each disposed between sidewalls of the circumferentially adjacent claw-shaped magnetic poles and magnetized in a direction to reduce leakage of magnetic flux between the circumferentially adjacent claw-shaped magnetic poles; preparing a non-magnetic magnet support ring, disposed on the plurality of permanent magnets on inner peripheral sides thereof, which includes a plurality of circumferentially spaced magnet supporting segments and interconnecting segments through which the plurality of magnet supporting segments are connected in an annular shape; locating the magnet support ring on inner peripheral sides of the claw-shaped magnetic poles of one of the pair of field iron cores in advance; inserting the permanent magnets into radial spaces each defined between the engaging stop portions of the claw-shaped magnetic poles and the magnet support ring such that the magnet support ring supports the inner peripheral sides of the permanent magnets under which the engaging stop portions restrict the permanent magnets from moving radially outward; and assembling the other one of the pair of field iron cores to the one of the pair of field iron cores.

With such a manufacturing method, none of the plurality of permanent magnets is fixedly attached to the magnet support ring and the plurality of permanent magnets and the magnet support ring can be separately assembled to the field iron cores. That is, the magnet support ring is located on the inner peripheral sides of the claw-shaped magnetic poles of one of the pair of field iron cores in advance. Subsequently, the permanent magnets can be inserted to the radial spaces each defined between the engaging stop portions of the claw-shaped magnetic poles and the magnet support ring for assembly. This allows the magnet support ring to support the inner peripheral sides of the permanent magnets under which the engaging stop portions restrict the permanent magnets from moving radially outward. Therefore, even if a variation takes place in machining precision and assembling precision of the claw-shaped magnetic poles, no undue force acts on each permanent magnet, thereby preventing damage to each permanent magnet during assembly or in use. In contrast to the related art structure (disclosed in Patent Publication 1) wherein the plurality of permanent magnets are preliminarily fixed to the magnet support ring, the manufacturing method of the present invention has no need to form a magnet assembly. Thus, no need arises for the plurality of permanent magnets and the magnet support ring to be positioned in the positional relationship with increased precision. In addition, no need arises for the field iron cores to have increased parts precision and assembling precision, thereby achieving a reduction in production by that extent.

DETAILED DESCRIPTION OF PREFERRED EMBODIMENTS

Now, rotors of vehicle alternators of various embodiments will be described below with reference to the accompanying drawings.

First Embodiment

A first embodiment will be described below with reference to one example of a rotary electric machine as applied to a vehicle alternator.

Figure 1:
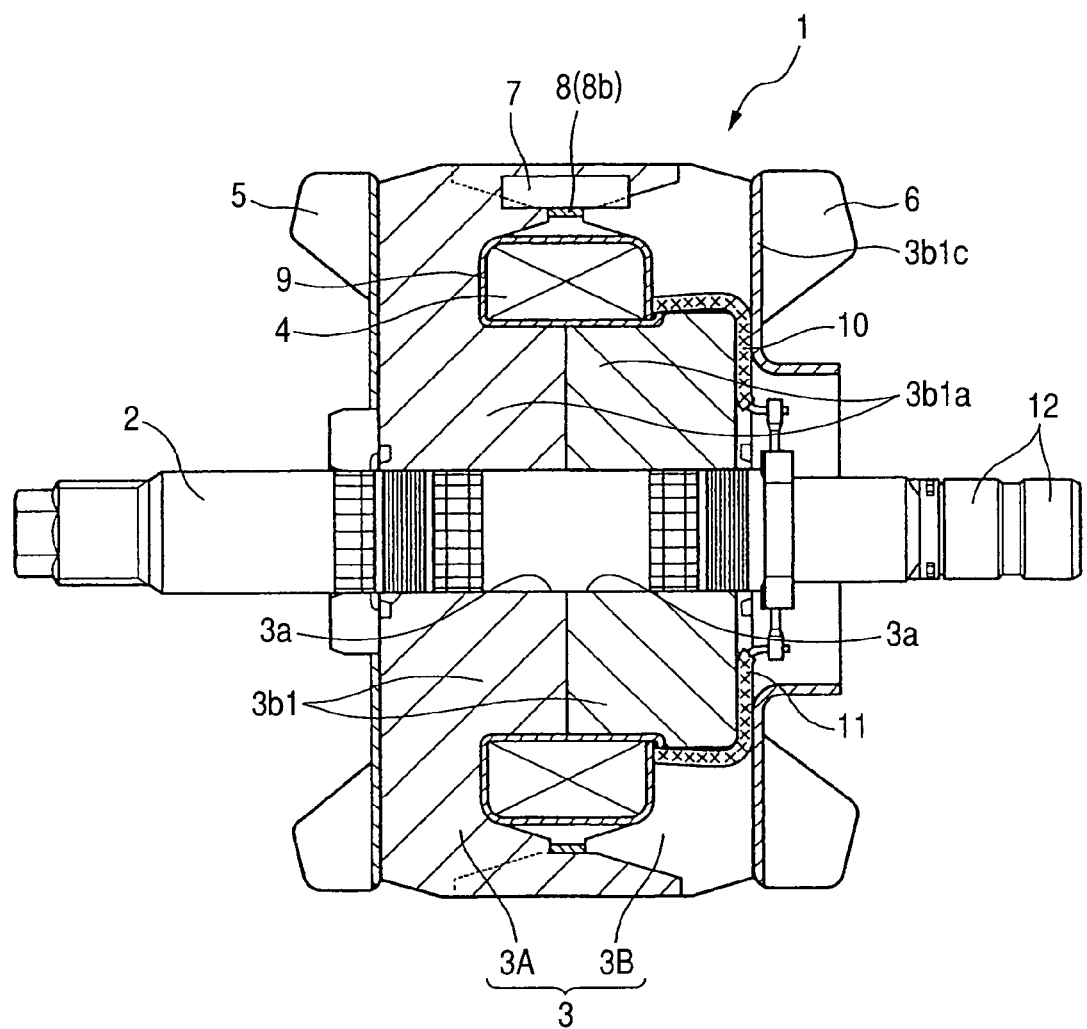
FIG. 1 is a cross-sectional view of a rotor of an electric rotary machine of one embodiment according to the present invention.

FIG. 1 is a cross-sectional view of a rotor 1 serving as a field magnet of the vehicle alternator.

The rotor 1 includes a rotary shaft 2 rotatably supported with a housing (not shown) by means of bearings (not shown), a pair of field iron cores 3 (3A, 3B) fixedly mounted on the rotary shaft 2, a field winding 4 wound on the field iron cores 3, cooling fans 5 and 6 fixedly secured to axially facing end faces of the pair of field iron cores 3, a plurality of permanent magnets (with sixteen pieces with the present embodiment and hereinafter abbreviated as "magnets") 7 each assembled between each pair of field iron cores 3, and a support ring 8 for supporting the magnets 7 at radially facing inner circumferential areas of the rotor 1.

The rotary shaft 2 has one axial end (on a left hand side in FIG. 1) carrying thereon a pulley (not shown) through which a rotational drive power of an engine is transferred by means of a belt power transfer.

The pair of field iron cores 3 is composed of first and second iron field cores 3A and 3B, which are formed in the same shapes and assembled to each other in a unitary structure.

Figure 2:
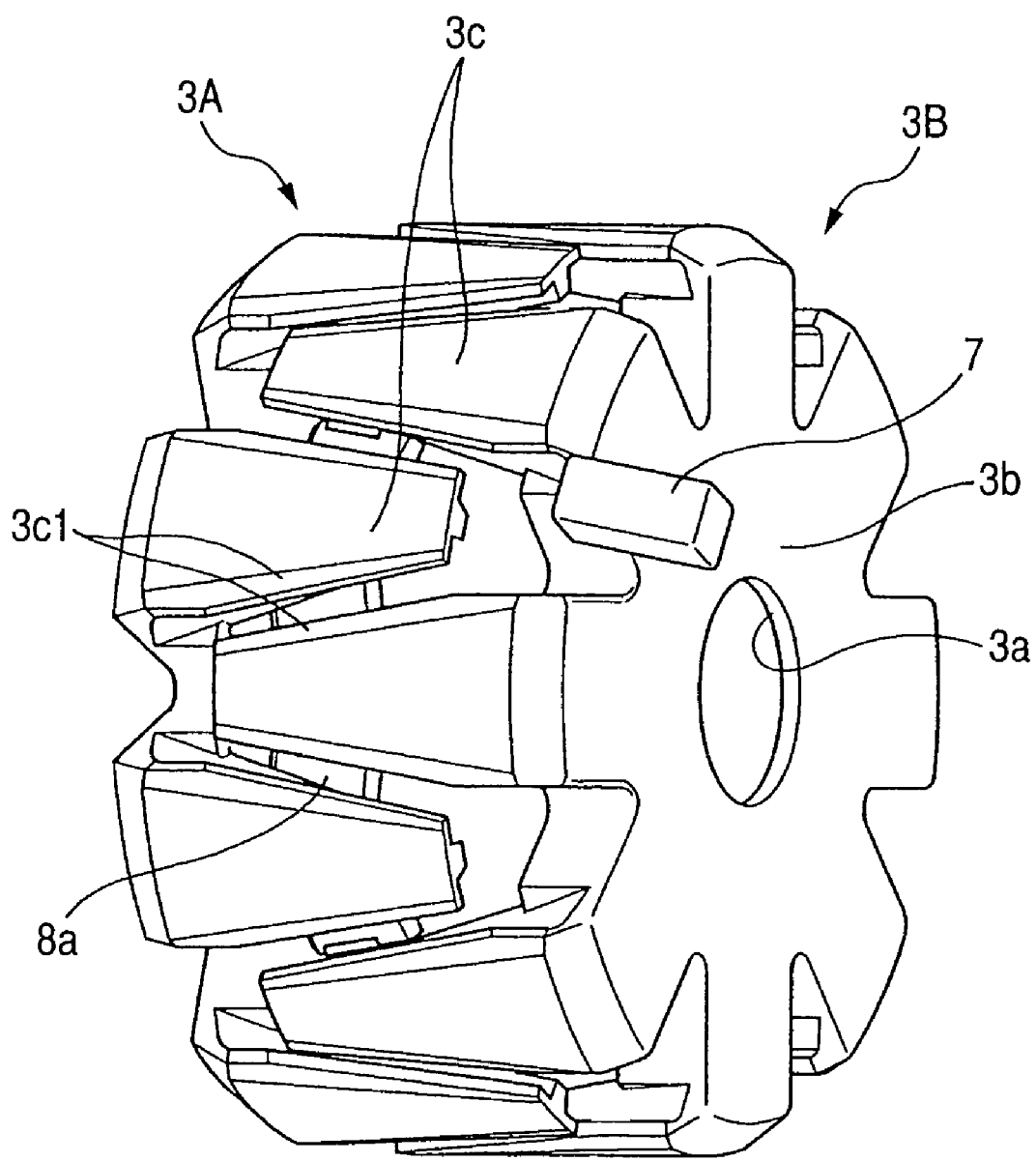
FIG. 2 is a perspective view of field iron cores forming the rotor shown in FIG. 1.

As shown in FIG. 2, the iron field iron cores 3A and 3B include core hubs 3b axially spaced from one another and having radially central areas formed with through-bores 3a (see FIG. 2), respectively, through which the rotary shaft 2 extends. Each of the core hubs 3b has a radially outward area from which a plurality of claw-shaped magnetic poles 3c (eight pieces with the present embodiment) axially protrudes at circumferentially and equidistantly spaced intervals.

The core hubs 3b are integrally formed with boss portions 3b1 each having one side axially extending toward each other (see FIG. 1) to allow the plural claw-shaped magnetic poles 3c to be juxtaposed in circumferentially equidistantly spaced positions (see FIG. 2) so as to provide an annular recessed portions to carry the field winding 4 on the boss portions 3b1 at outer circumferential peripheries thereof.

Figure 5:
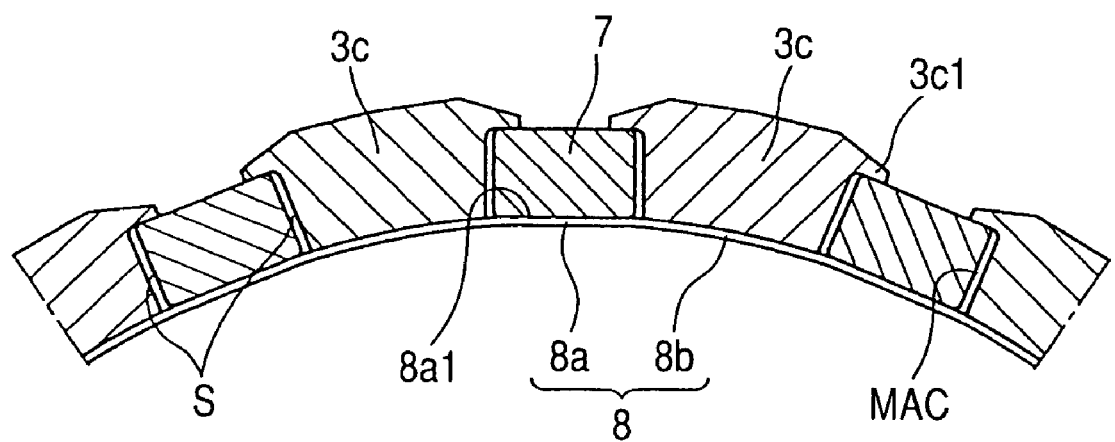
FIG. 5 is a fragmentary cross-sectional view showing one example of the relationship between claw-shaped magnetic poles, permanent magnets and the magnet support ring.

The plural claw-shaped magnetic poles 3c are formed on the core hubs 3b at circumferentially equidistantly spaced positions and each of the plural claw-shaped magnetic poles 3c has a substantially V-shaped configuration that extends from a base end portion contiguous with each core hub 3b toward a distal end portion thereof such that a width in a circumferential direction gradually decreases along an axis of the rotary shaft 2. In addition, as shown in FIGS. 2 and 5, each of the plural claw-shaped magnetic poles 3c has both circumferentially spaced sidewalls, facing opposite to each other in the circumferential direction, which are formed with holding portions 3c1 in the form of flanges protruding in the circumferential direction, respectively.

As shown in FIG. 1, the iron field iron cores 3A and 3B are assembled to each other such that both the boss portions 3b1 have end faces placed in abutting engagement with each other in the axial direction. This allows the respective claw-shaped magnetic poles 3c to be brought into meshing engagement with each other with a given distance provided between claw-shaped magnetic poles 3c in the circumferentially direction.

As shown in FIG. 1, the boss portions 3b1 have axially extending circular shoulder portions 3b1a carrying thereon a spool 9 on which the field winding 4 is wound. The field winding 4 has a leading wiring end and a trailing wiring end that are connected to lead wires 10 and 11, respectively, through which the leading wiring end and the trailing wiring end are electrically connected to one set of slip rings 12 mounted on the rotary shaft 2 at the other end thereof (at an end opposite to the pulley). This allows a field current to be supplied from a battery (not shown) via brushes (not shown) held in sliding engagement with the slip rings 12 at outer circumferential peripheries thereof. As the field current flows through the field winding 4, all of the plural claw-shaped magnetic poles 3c, formed on one field core 3A, are magnetized in S poles (or N poles), whereas all of the plural claw-shaped magnetic poles 3c, formed on the other field core 3B, are magnetized in N poles (or S poles).

The cooling fans 5 and 6 include a front cooling fan 5 fixed to an end face 3b1b of the core hub 3b1 of one field core 3A by resistance welding, and a rear cooling fan 6 fixed to an end face 3b1c of the core hub 3b1 of the other field core 3B by resistance welding.

As shown in FIG. 5, each of the magnets 7 is inserted to a magnet accommodating space MAC defined in terms of a radial spacing between the holding portions 3c1 of the adjacent claw-shaped magnetic poles 3c and a supporting ring 8 placed in inner circumferential an areas of the claw-shaped magnetic poles 3c and a circumferential dimension between sidewalls of the claw-shaped magnetic poles 3c adjacent to each other in the circumferential direction. With the magnets 7 held in such a layout, the magnets 7 are magnetized such that a surface of one claw-shaped magnetic pole 3c, facing the sidewall of the other claw-shaped magnetic pole 3c, is magnetized in the same pole as that of one claw-shaped magnetic pole 3c. That is, each of the magnets 7 is magnetized in an orientation to minimize a leakage of fluxes between the adjacent claw-shaped magnetic poles 3c between which the magnet 7 is sandwiched. The magnets 7 may be made of rare-earth magnets or ferrite sintered magnets or the like with overall shapes substantially formed in cubic bodies, respectively.

The supporting ring 8, formed of stainless steel or resin and the-shaped that are non-magnetic materials, includes a plurality of circumferentially and equidistantly spaced magnet supporting segments 8a, operative to individually support the magnets 7, respectively, and a plurality of interconnecting segments 8b each disposed between adjacent magnet supporting segments 8a for connecting the plurality of magnets 7 in an annular configuration.

The magnet supporting segments 8a have outer surfaces 8a1, operative to support the magnets 7, respectively, which serve as abutment faces formed in flat configurations, respectively. Each of the magnet supporting segments 8a has a length, corresponding to a longitudinal direction of each magnet 7, which is set to be longer than a width (in dimension in a direction perpendicular to a circumferential direction of the supporting ring 8). In addition, the length of each magnet supporting segment 8a may be selected to be greater than that of each magnet 7 but no need necessarily arises to be longer than the length of each magnet 7 because a needless increase in length merely results in waste of material. That is, the length of each magnet supporting segment 8a may be selected to be shorter than that of each magnet 7 provided that the magnet supporting segment 8a can stably support the magnet 7. One example of each magnet supporting segment 8a may have the substantially same shape and surface area as a shape and a surface area of an inner circumferential surface of each magnet 7 supported with the magnet supporting segment 8a.

The magnet supporting segment 8a is placed with a given inclination with respect to each interconnecting segment 8b in the circumferential direction of the supporting ring 8 so as to allow the adjacent magnet supporting segments 8a to be inclined in opposite directions. That is, the plurality of magnet supporting segments 8a are alternately inclined in the same direction in conformity to an assembling direction of the magnets 7.

Further, each of the magnet supporting segments 8a has both ends, oriented in a direction corresponding to a longitudinal length of each magnet 7, which are formed with guide portions 8c, respectively. The guide portions 8c are bent radially inward of the supporting ring 8 so as to prevent corner portions of each magnet 7 from impinging against the claw-shaped magnetic pole 3c and distal ends of each interconnecting segment 8b. That is, the guide portions 8c serve to allow the magnet 7 to be easily inserted to the magnet accommodating space MAC. Moreover, the guide portions 8c have no need to be formed on the magnet supporting segment 8a at both ends thereof and, in an alternative wherein a direction in which the magnet 7 is inserted is specified in one direction, one guide portion 8c may be formed at either one of the ends in line with such one direction.

As shown in FIG. 5, the interconnecting segments 8b are placed in circular arc areas along inner peripheral walls of the claw-shaped magnetic poles 3c, respectively, to be positioned each between a stepped portion formed on one claw-shaped magnetic pole 3c at the inner peripheral wall thereof and a stepped portion formed on the other claw-shaped magnetic pole 3c at the inner peripheral wall thereof such that the both of the stepped portions restrict the movement of each interconnecting segment 8b in an axial direction. However, each interconnecting segment 8b is structured such that each interconnecting segment 8b can axially move by a slight extent so as not to create a clearance (air gap) between both of the boss portions 3b1 when the field iron cores 3A and 3B are assembled together.

Figure 4:
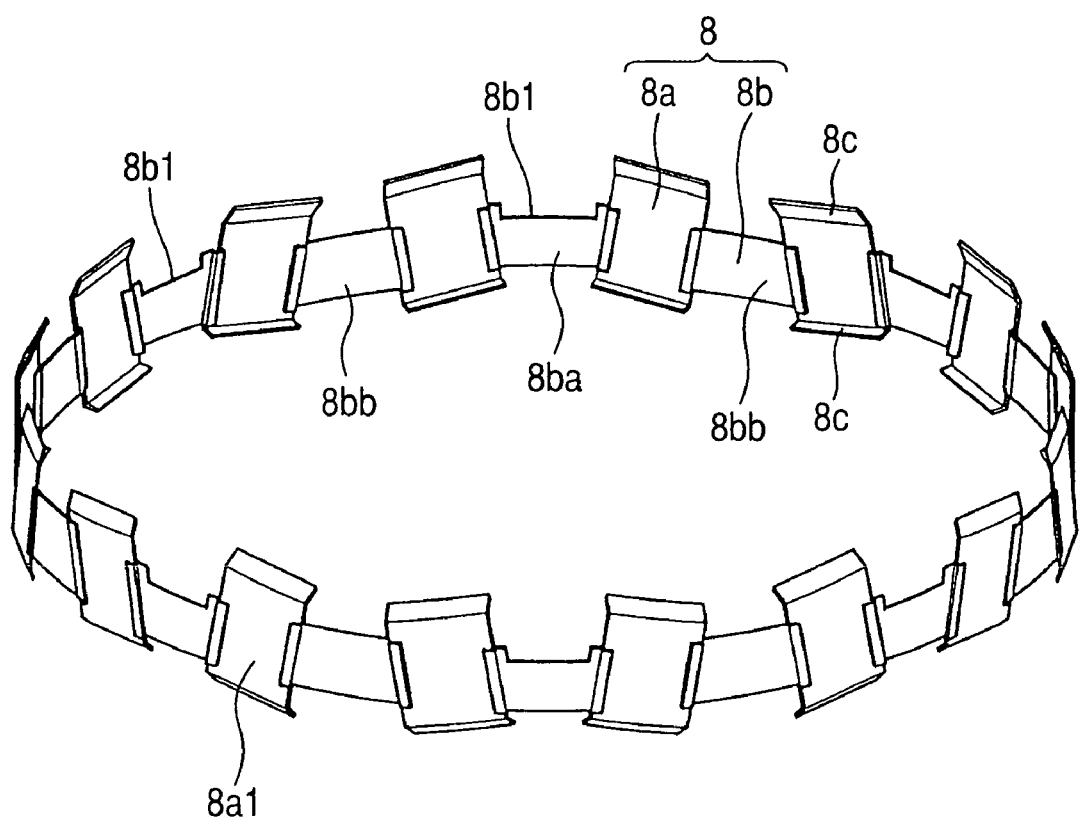
FIG. 4 is a perspective view showing a magnet support ring used for the rotor shown in FIG. 1.

As shown in FIG. 4, the interconnecting segments 8b include a first plurality of interconnecting segments 8ba, each of which has axially facing one side (at an upper side in FIG. 4) formed with a concave portion 8b1, and a second plurality of interconnecting segments 8bb each of which has no concave portion 8b1. The first and second pluralities of interconnecting segments 8ba and 8bb are alternately placed in a circumferential direction of the supporting ring 8 with the magnet supporting segment 8a being sandwiched between the adjacent interconnecting segments 8ba and 8bb. The interconnecting segment 8ba, having the concave portion 8b1, has a width slightly smaller than that of the interconnecting segment 8bb having no concave portion 8b1. Thus, when the other side of the interconnecting segment 8b in a widthwise direction is brought into abutting engagement with one stepped portion of the claw-shaped magnetic pole 3c, a slight amount of clearance is ensured between one side portion, having the concave portion 8b1, and the other stepped portion of the claw-shaped magnetic pole 3c. Thus, the width of the interconnecting segment 8b has no adverse affect on axial positions of the pair of field iron cores 3. This allows the boss portion 3b1 of the field core 3A and the boss portion 3b1 of the field core 3B to be reliably brought into abutting engagement with each other, thereby enabling a magnetic circuit to be formed between the both of the boss portions 3b1 in the absence of an air gap.

Next, a method of assembling the magnets 7 will be described below.

Figure 3:
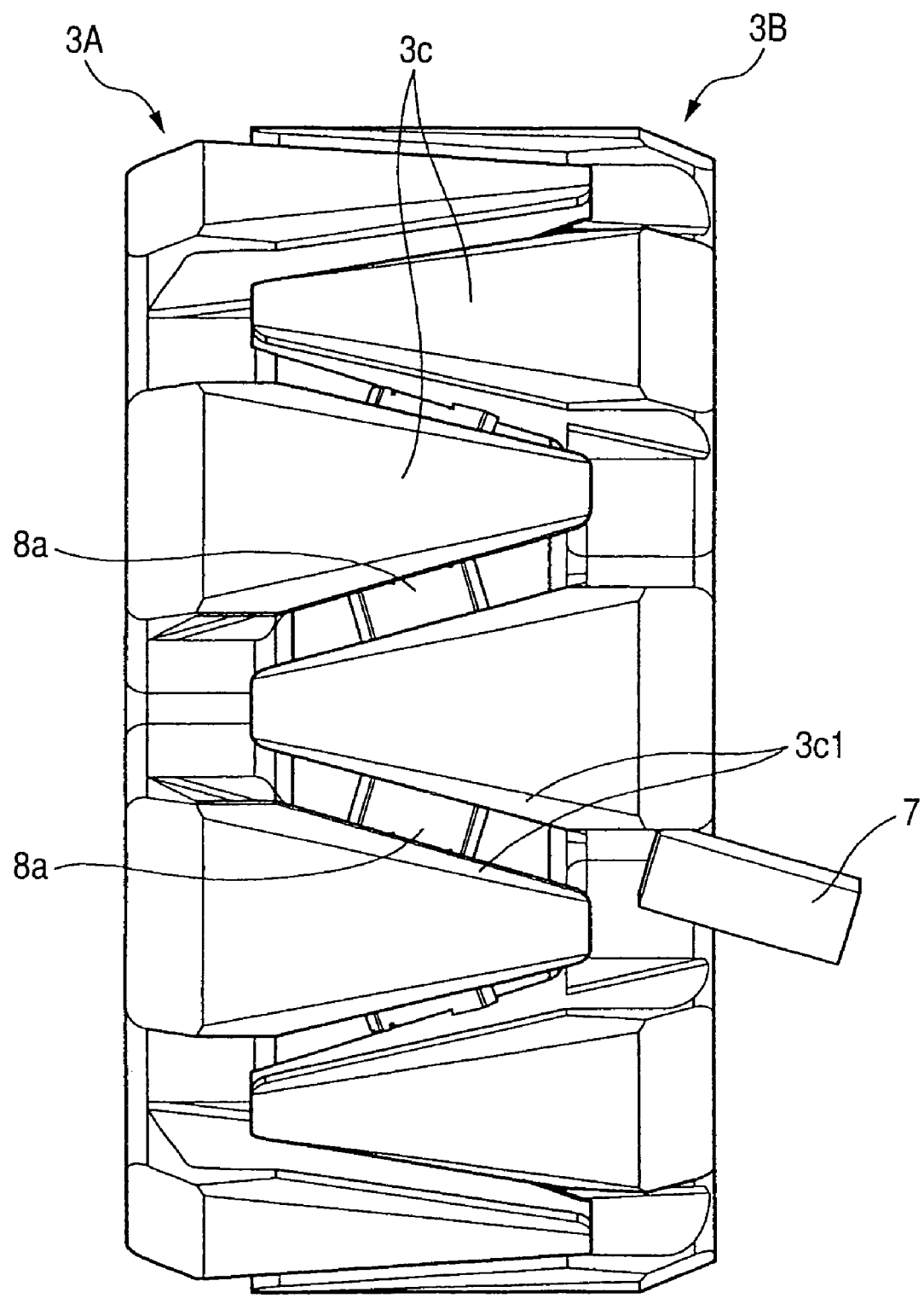
FIG. 3 is a side view of the field iron cores forming the rotor in FIG. 1.

The magnets 7 are not preliminarily fixed to the supporting ring 8 and assembled separately from the supporting ring 8. That is, before assembling the magnets 7, the supporting ring 8 is preliminarily placed on inner peripheral sides of the claw-shaped magnetic poles 3c with the pair of field iron cores 3 being assembled. As shown in FIGS. 2 and 3, thereafter, the magnets 7 are inserted to the magnet accommodating spaces along their longitudinal directions for assembly. When this takes place, each of the magnets 7 is inserted with a slight tightening margin being provided in a radial spacing between the holding portion 3c1 (see FIG. 5) of each claw-shaped magnetic pole 3c and the magnet supporting segment 8a of the supporting ring 8. That is, with the magnets 7 having the radially facing inner peripheral walls held in abutting engagement with the magnet supporting segment 8a of the supporting ring 8, both shoulder portions of the magnets 7 at the outer peripheral walls thereof are pressed against inner walls of the holding portions of the claw-shaped magnetic poles 3c such that radially outward movements are restricted.

Figure 6:
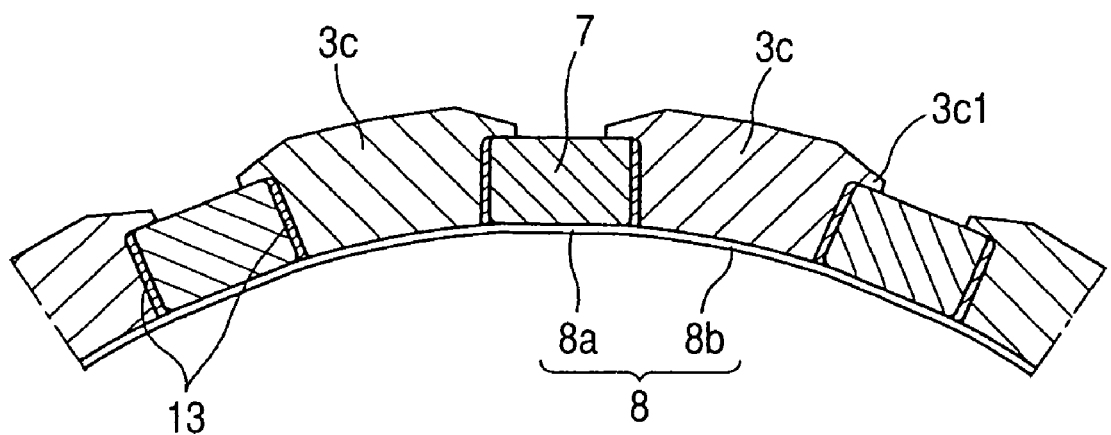
FIG. 6 is a fragmentary cross-sectional view showing the relationship between claw-shaped magnetic poles, permanent magnets and the magnet support ring with impregnant being filled in each clearance between a sidewall of each permanent magnet and a sidewall of an adjacent claw-shaped magnetic pole.

Further, each magnet 7 is formed in a structure that is slightly smaller than a circumferential dimension between the sidewalls of the claw-shaped magnetic poles 3c placed adjacent to each other in the circumferential direction. Therefore, as shown in FIG. 5, there are clearances S each between the sidewall of the magnet 7 on a side facing in the circumferential direction and the sidewall of each claw-shaped magnetic pole 3c. To bury such clearance S, as shown in FIG. 6, impregnant 13 such as epoxy resin or the-shaped may be filled in the clearances S. This enables the impregnant 13 to fixedly retain each magnet 7 such that each magnet 7 can be held in a further reliable manner.

Figure 7:
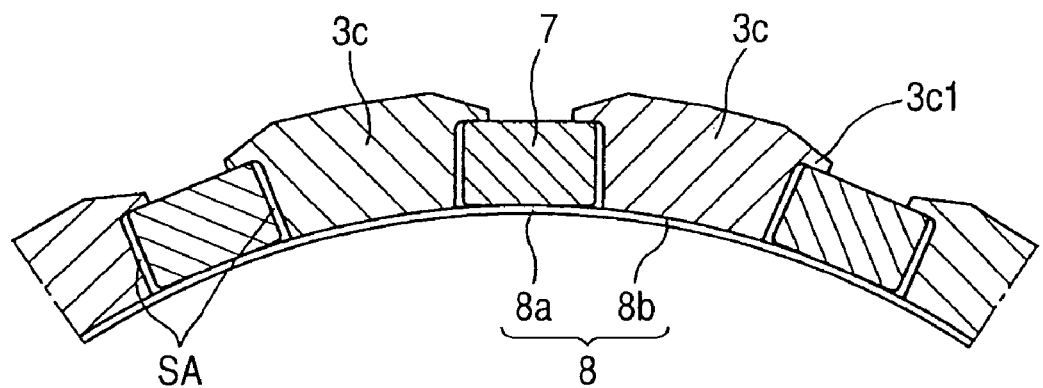
FIG. 7 is a fragmentary cross-sectional view showing another example of the relationship between claw-shaped magnetic poles, permanent magnets and the magnet support ring.
Figure 8:
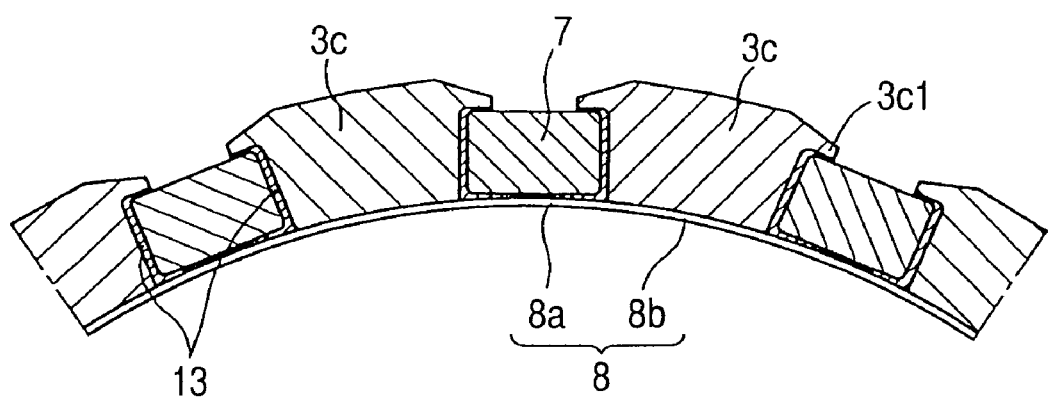
FIG. 8 is a fragmentary cross-sectional view showing another example of the relationship between claw-shaped magnetic poles, permanent magnets and the magnet support ring with impregnant being filled in each clearance between a sidewall of each permanent magnet and a sidewall of an adjacent claw-shaped magnetic pole.

With the present embodiment set forth above, while one example of the supporting ring 8 has been described with reference to the magnet supporting segments 8a formed in the flat surfaces, the magnet supporting segments 8a may be formed in circular arc shapes each with the same radius of curvature as that of each interconnecting segment 8b as shown in FIGS. 7 and 8. Even with such alternative structures, the impregnant 13 such as epoxy resin or the-shaped may be filled in clearances SA each formed between the sidewall of each magnet 7 and the sidewall of the claw-shaped magnetic pole 3c as shown in FIG. 8.

Advantageous Effect of First Embodiment

The magnet accommodating space and the position, in which each magnet 7 is located, significantly depend on machining precisions of the claw-shaped magnetic poles 3c provided on the field iron cores 3 and assembling precision of the claw-shaped magnetic poles 3c. Stated another way, if fluctuations occur in machining precisions of the claw-shaped magnetic poles 3c provided on the field iron cores 3 and assembling precision of the claw-shaped magnetic poles 3c, there is a risk of variations caused in dimension with different magnet accommodating spaces present in plural areas. In contrast, with the rotor 1 of the present embodiment, since the plural magnets 7 are not fixedly attached to the supporting ring 8, the supporting ring 8 is placed on the inner peripheral walls of the claw-shaped magnetic poles 3c on a preceding stage, under which the plurality of magnets 7 can be subsequently inserted to the individual magnet accommodating spaces to be assembled in a unitary structure. Therefore, even if fluctuations exist in machining precisions of the claw-shaped magnetic poles 3c provided on the field iron cores 3 and assembling precision of the claw-shaped magnetic poles 3c, the plurality of magnets 7 can be individually inserted to the magnet accommodating spaces for assembly, respectively.

With such a structure, no undue force is applied to the magnets 7, thereby preventing the magnets 7 from rupturing during assembly or in use. As a result, no need arises to form a magnet assembly, in contrast to the related art (disclosed in Patent Publication 1) in which the plurality of magnets 7 is preliminarily fixed to the supporting ring 8. Thus, there is no need to allow the plurality of magnets 7 and the supporting ring 8 to be positioned in a positional relationship with increased precision. In addition, no need arises to increase manufacturing precision and assembling precision of the field iron cores 3, thereby achieving a reduction in cost to that extent.

Further, the magnets 7 are inserted to the spaces each between the holding portion 3c1 of each claw-shaped magnetic pole 3c and the magnet supporting segment 8a of the supporting ring 8 in a radial dimension with a slight degree of tightening margin. That is, each of the magnets 7 is held in abutting engagement with both the holding portion 3c1 of each claw-shaped magnetic pole 3c and the magnet supporting segment 8a of the supporting ring 8. This ensures the magnet 7 to be fixed in a more reliable manner against centrifugal stress.

With the impregnant 13 filled in the space between the sidewall of each magnet 7 and the sidewall of each claw-shaped magnetic pole 3c, further, the magnet 7 can be fixed in a further stable fashion in the presence of the impregnant 13, resulting in a further increase in fixing reliability of the magnet 7.

The supporting ring 8 of the present embodiment has the magnet supporting segments 8a each formed in the flat shape. As a result, the magnets 7 can be fixed in place in stable fashions. This results in a reduction in surface pressure of the abutting engagement surface between the magnet 7 and the magnet supporting segments 8a, thereby increasing reliabilities of the supporting ring 8 and the magnet 7.

Furthermore, the supporting ring 8 takes the form of a structure in which the magnet supporting segments 8a has a length greater (to be longer) than the width of the interconnecting segment 8b. This enables the magnet 7 to be stably pressed against the holder portion 3c1 of the claw-shaped magnetic pole 3c, resulting in an increase in reliability of the magnet 7 against centrifugal force acting thereon.

Further, suitably decreasing the width of the interconnecting segment 8b with respect to the magnet supporting segments 8a results in a capability of obtaining advantageous effects as described below.

Figure 9:
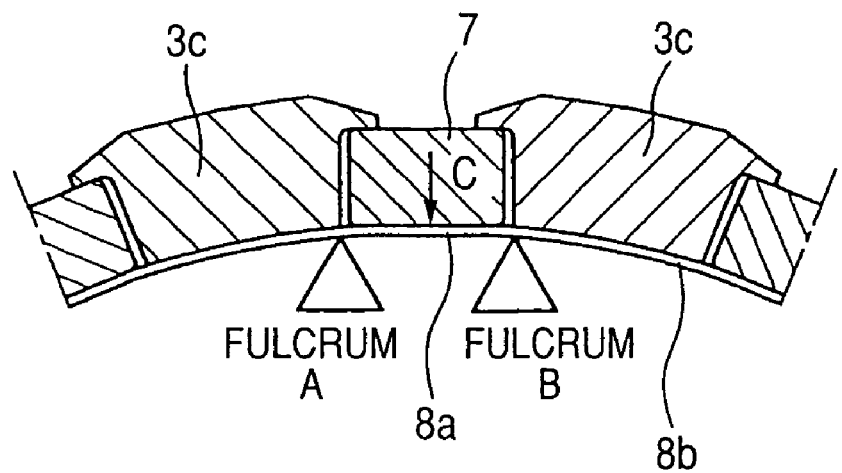
FIG. 9 is a fragmentary cross-sectional view showing the relationship between the claw-shaped magnetic poles, the permanent magnets and the magnet support ring for illustrating an advantageous effect of the present invention.
Figure 10:
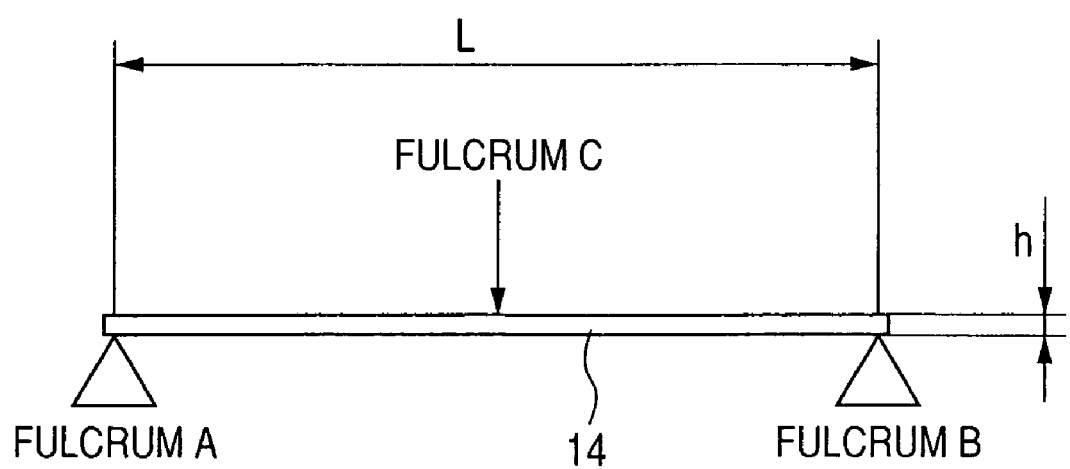
FIG. 10 is a modeling diagram for illustrating an effect of a both-end fixed beam.

As shown in FIG. 9, it can be conceived that the supporting ring 8 of the present embodiment is a both-end fixed beam with fulcrums on a point A and a point B in FIG. 9. With a model of the both-end fixed beam, as shown in FIG. 10, a fulcrum portion (the points A or B) corresponds to the interconnecting segment 8b and a portion of a beam 14 corresponds to the magnet supporting segments 8a. In addition, a point C in FIG. 10 represents a load point, at which a load occurs at a magnitude equal to an elastic force F (a force causing the magnet 7 to be pressed against the holder portion 3c1 of each claw-shaped magnetic pole 3c) that can be expressed in an equation indicated below.

$$F = k \times \delta \quad (1)$$

Where "k" represents a spring constant (N/mm) of the beam 14 and "δ" an amount of deflection (mm).

Further, the spring constant (N/mm) of the beam 14 can be expressed as $$k = E \times b \times h^3 / (2 \times L^3) \quad (2)$$

Where "E" represents Young's modulus (N/mm²) of material of the beam; "b" a width (mm) of the beam 14; "h" a thickness (mm) of the beam 14; and "L" a length (mm) of the beam 14.

Figure 11:
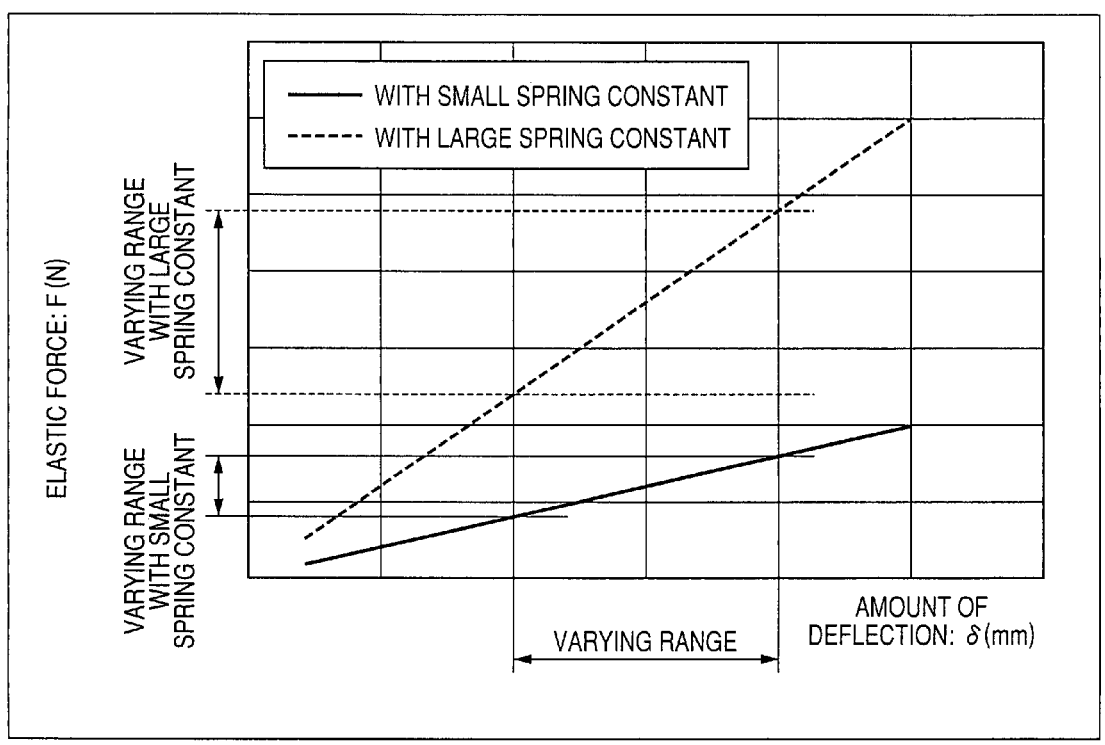
FIG. 11 is a graph showing the relationship between the amount of deflection and an elastic force.

Accordingly, decreasing a width (the width "b" of the beam "b") of the interconnecting segment 8b results in a reduction in the spring constant, causing the elastic force F to vary in terms of the deflection 6 of the beam 14 in a manner as shown in FIG. 11.

A variation in dimension of the magnets 7 and a dimensional fluctuation in the claw-shaped magnetic poles 3c result in the occurrence of a variation in the amount of deflection of the beam 14. As shown in FIG. 11, if the spring constant is small, it becomes possible to suppress the occurrence of variation in the elastic force of the beam 14, thereby making it possible to obtain a stable elastic force. Also, as will be apparent from the equation (2) set forth above, decreasing the length "h" of the beam 14 and Young's modulus of the beam material or increasing the length "L" of the beam 14 enable similar effects to be obtained.

Second Embodiment

Figure 12:
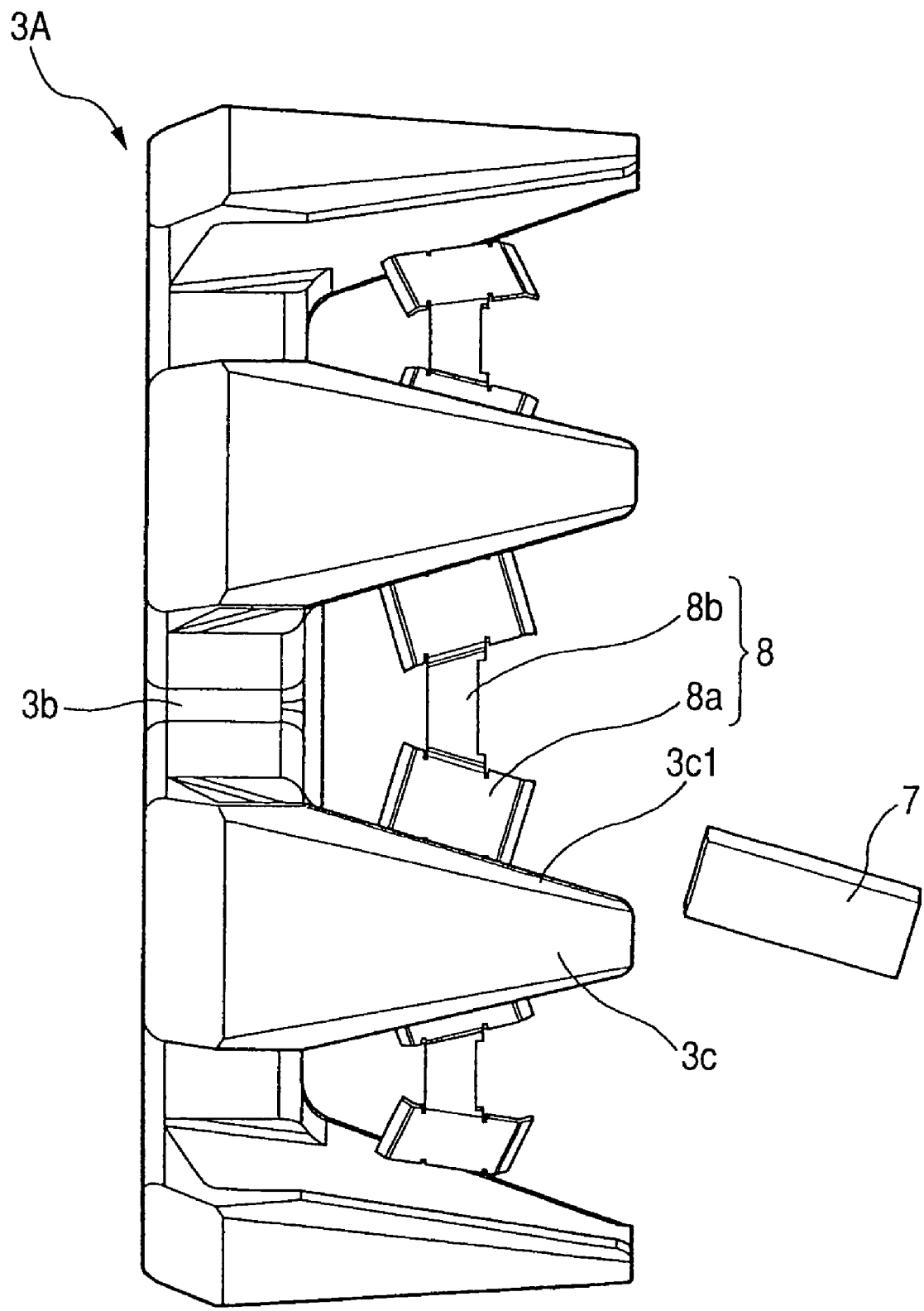
FIG. 12 is a side view showing one of field iron cores forming a rotor of another embodiment according to the present invention.

FIG. 12 is a plan view showing how the magnets 7 are assembled in place.

The first embodiment has been described above with reference to an example in which the supporting ring 8 is preliminarily located on the claw-shaped magnetic poles 3c at the inner peripheral sides thereof and, subsequently, the magnets 7 are inserted to the magnet accommodating spaces for assembly. A second embodiment will be described below with reference to another example in which the magnets 7 are assembled before the pair of field iron cores 3 are assembled together.

First, of the pair of field iron cores 3, either one of these field iron cores 3, i.e., for instance, the supporting ring 8 is located on the claw-shaped magnetic poles 3c of the field core 3A.

As shown in FIG. 12, in consecutive step, the magnets 7 are inserted to radial compartments each specified between the holder portion 3c1, formed on each claw-shaped magnetic pole 3c, and each magnet supporting segment 8a in a radial dimension. When this takes place, the magnets 7 are inserted between the holder portions 3c1 and the magnet supporting segments 8a each with a slight degree of tightening margin in respect of the radial direction. Thus, no risk occurs for the magnets 7 from simply dropping off from the field core 3A.

Thereafter, assembling the remaining field core (field core 3B) to the field core 3A allows the magnets 7 to be retained in spaces each between the claw-shaped magnetic pole 3c of the field core 3A and the claw-shaped magnetic pole 3c of the field core 3B.

Even with the assembling method shown in the second embodiment, —shaped the assembling carried out with the first embodiment, the supporting ring 8 is located on the claw-shaped magnetic poles 3c at the inner peripheries thereof in advance and, subsequently, the plurality of magnets 7 can be individually assembled. Thus, no forced impact is applied to the magnets 7, thereby preventing damages to the magnets 7 during assembling or in use. In addition, no need arises for the plural magnets 7 and the supporting ring 8 to be positioned in a positional relationship with increased precision. Further, no need arises for component precisions of the field iron cores 3 and the assembling precision to be increased, thereby enabling a reduction in cost.

Third Embodiment

Figure 13:
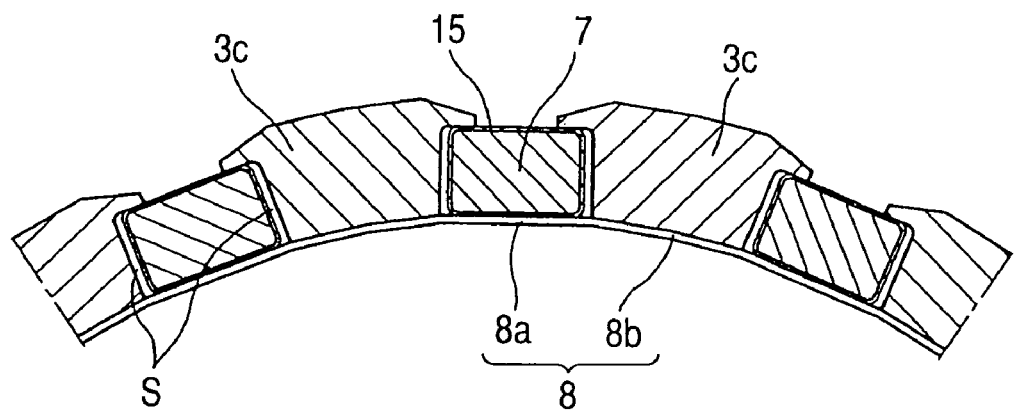
FIG. 13 is a fragmentary cross-sectional view showing the relationship between claw-shaped magnetic poles, permanent magnets and a magnet support ring forming a rotor of another embodiment according to the present invention.

FIG. 13 is a cross-sectional view of the claw-shaped magnetic poles 3c, the magnets 7 and a supporting ring 8A.

With a third embodiment, the magnets 7 are accommodated in holders 15, respectively. Each of the folders 15 is made of non-magnetic material, such as, for instance, stainless steel or resin and the-shaped, and formed in a box-shaped configuration in conformity to each of the holders 15 with which an entire surface of each magnet 7 is encompassed.

Figure 15:
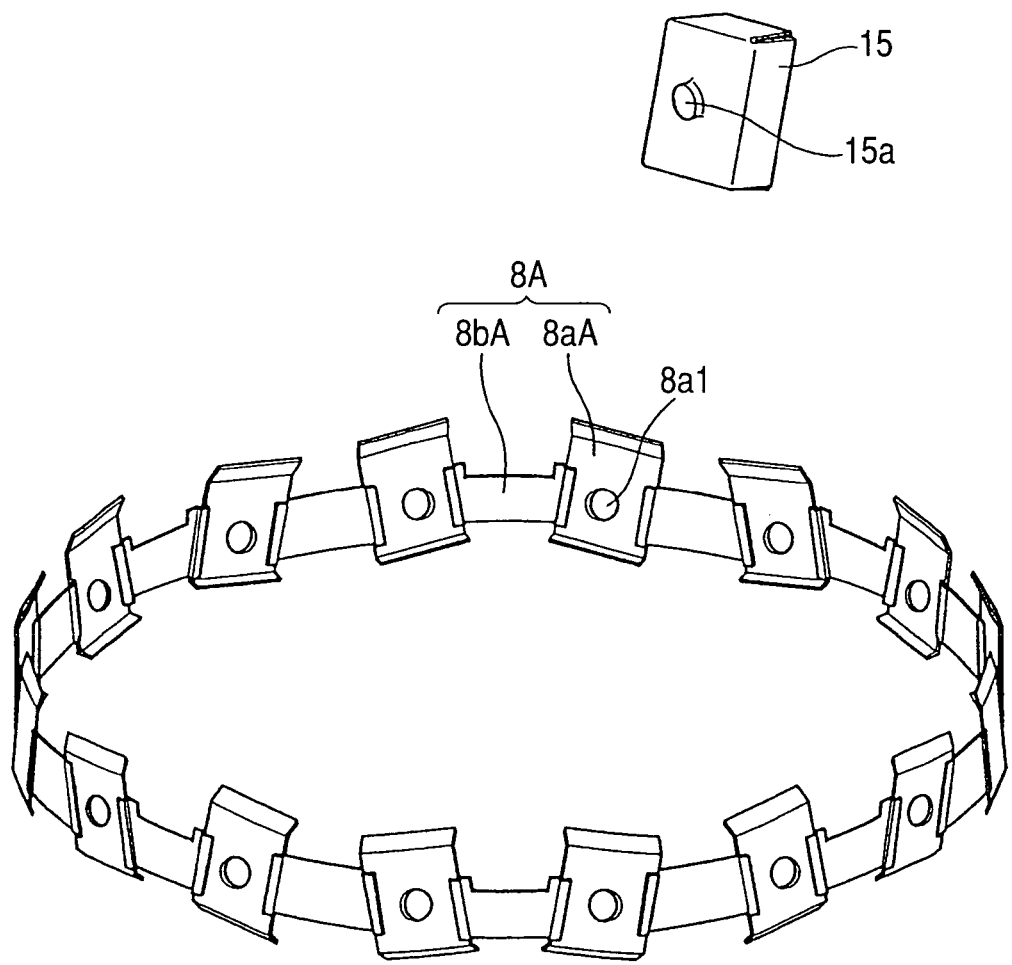
FIG. 15 is a perspective view showing the magnet support ring, shown in FIG. 3, for illustrating the relationship between each magnet supporting segment and each permanent magnet enveloped in a non-magnetic holder.

As shown in FIG. 15, the holders 15 have inner peripheral walls whose central areas are formed with radial protrusions 15*a* to be positioned in a magnet supporting segments 8*a*A of the supporting ring 8A. Meanwhile, the magnet supporting segments 8*a*A have positioning hole (apertured portion)s 8*a*1 to which the protrusions 15*a* of the holders 15 are brought into fitting engagement. Causing the positioning hole (apertured portion)s 8*a*1 and the protrusions 15*a* to be brought into fitting engagement with each other enables the magnets 7 to be positioned in the magnet supporting segments 8*a*A. This reliably prevents the occurrence of axial displacements of the magnets 7 in directions in which the magnets 7 are inserted.

With such a structure of the third embodiment, the holders 15 internally accommodate the magnets 7, respectively, resulting in increases in strength of the magnets 7 against stress. By some chance, even if the magnets 7 are damaged, fractures of the magnets 7 can be prevented from scattering. In addition, while the holders 15, described with reference to the third embodiment, surround the entire surfaces of the magnets 7, respectively, an alternative may be such that, for instance, each of the holders 15 has a shape to cover each magnet 7 on at least an outer circumferential surface thereof in an area facing radially outward.

The supporting ring 8A may have the magnet supporting segments 8*a*A formed in the same flat surfaces (see FIG. 13) as those of the first embodiment. In addition, the magnet supporting segments 8*a*A of the supporting ring 8A may be formed in circular arc shapes (see FIG. 14) each with the same radius of curvature of each interconnecting segment 8*b*A.

Figure 16:
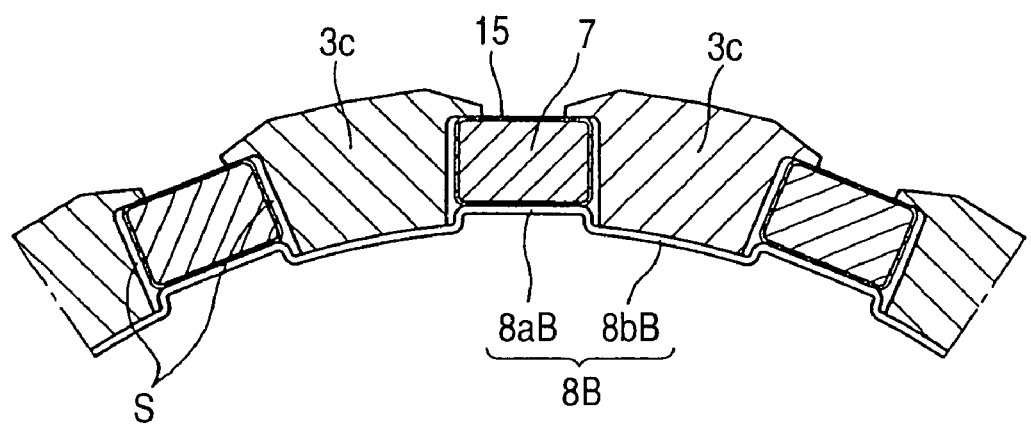
FIG. 16 is a fragmentary cross-sectional view showing one example of the relationship between claw-shaped magnetic poles, permanent magnets and a magnet support ring forming a rotor of a modified form of the rotor shown in FIGS. 13 to 15.
Figure 17:
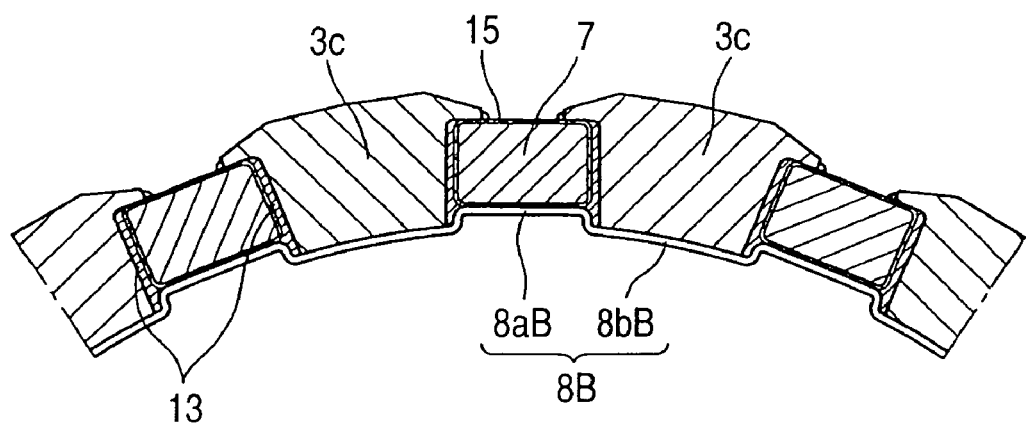
FIG. 17 is a fragmentary cross-sectional view showing another example of the relationship between claw-shaped magnetic poles, permanent magnets and a magnet support ring forming a rotor of another modified form of the rotor shown in FIGS. 13 to 15.
Figure 18:
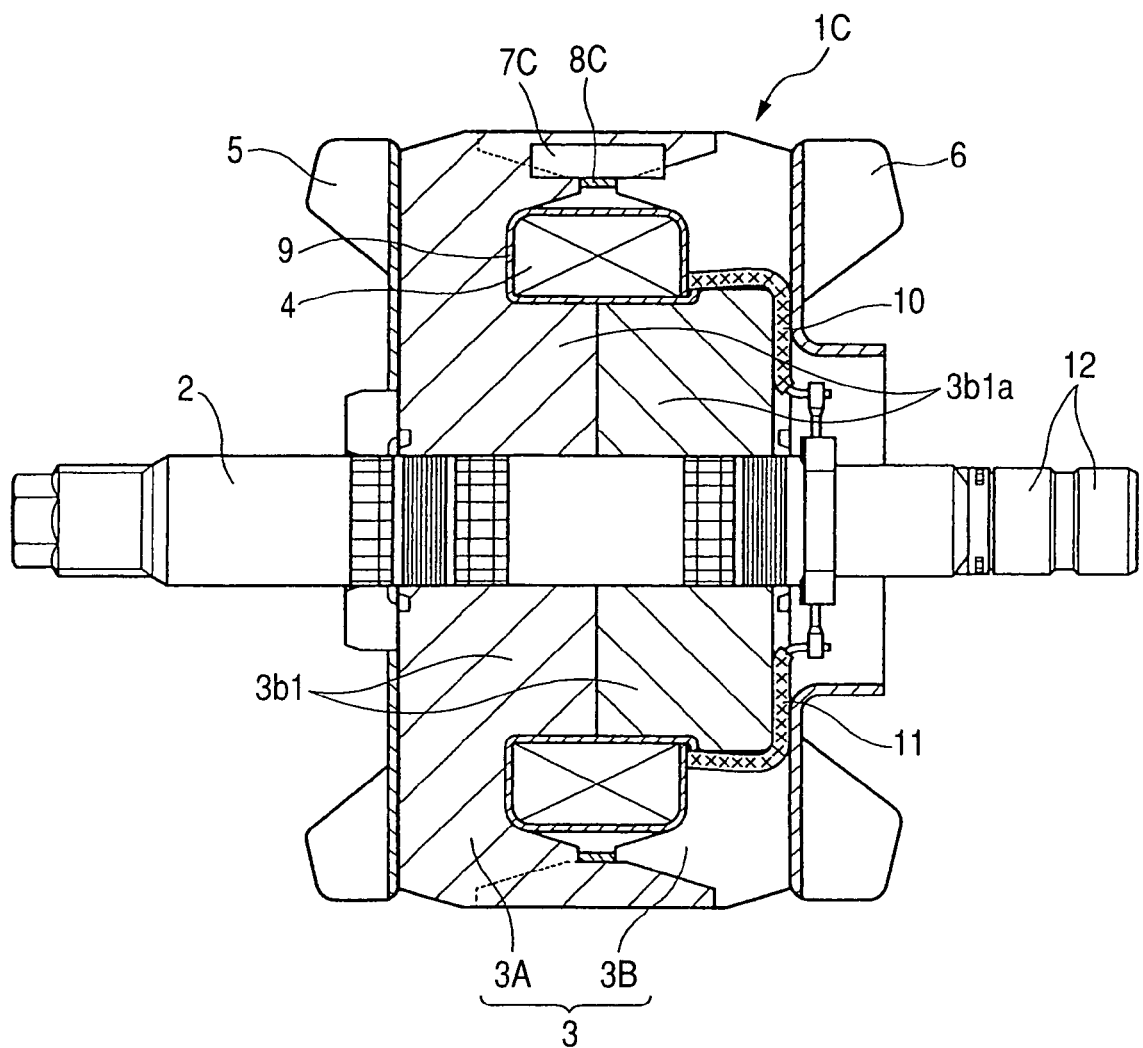
FIG. 18 is a cross-sectional view of a rotor of an electric rotary machine of another embodiment according to the present invention.
Figure 19:
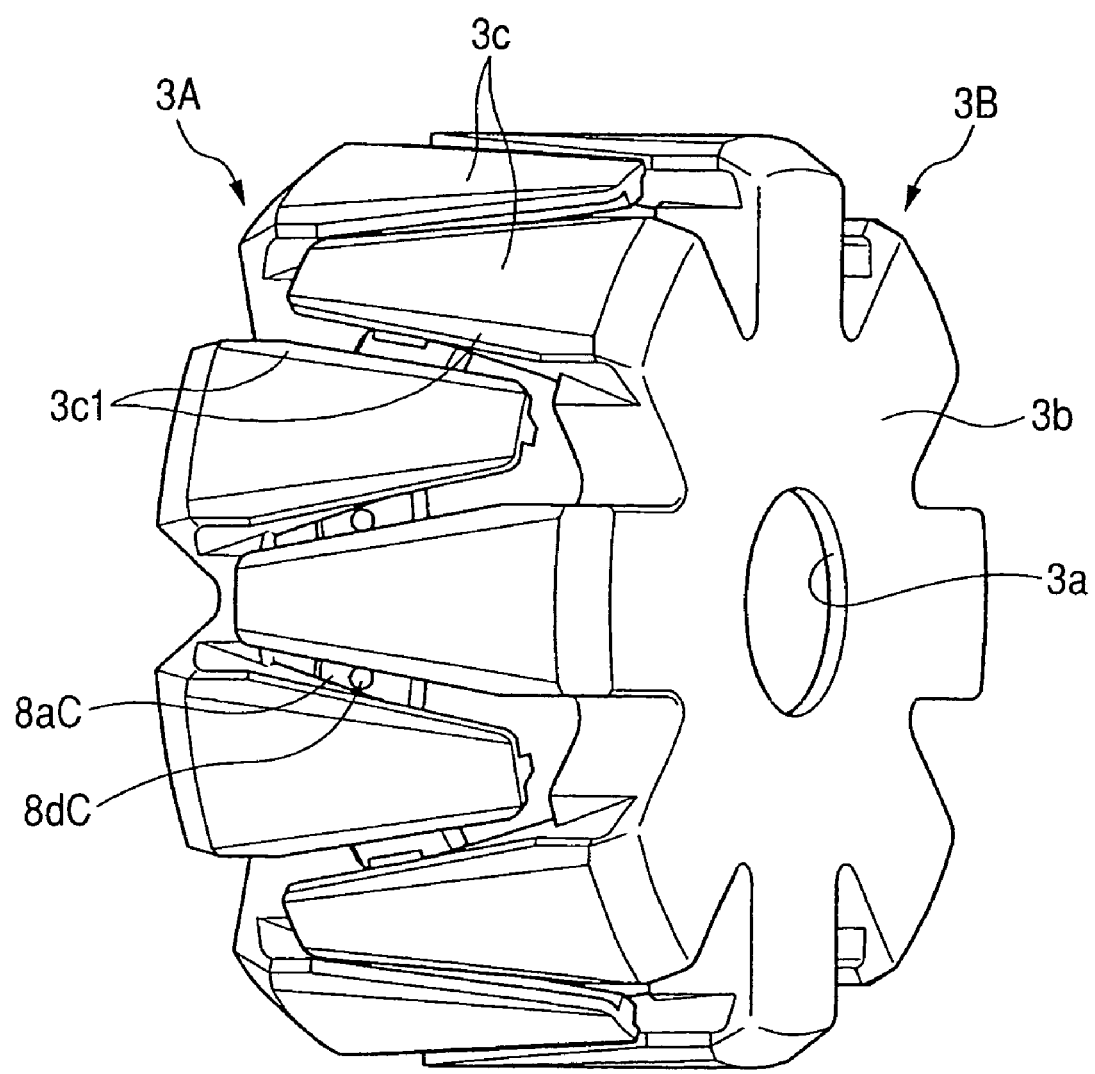
FIG. 19 is a perspective view of field iron cores forming the rotor shown in FIG. 18.

Moreover, the supporting ring 8A may be arranged to have stepped portions each between the interconnecting segment 8*b*A and the magnet supporting segment 8*a*A. More particularly, as shown in FIGS. 16 and 17, a supporting ring 8B may include circumferentially and equidistantly spaced magnet supporting segments 8*a*B and interconnecting segments 8*b*B each disposed between the adjacent magnet supporting segments 8*a*A. With such a structure, each of the magnet supporting segments 8*a*B is formed in a shape to protrude radially outward from the interconnecting segment 8*b*B to press each magnet 7 against the holder portions 3*c*1 of each claw-shaped magnetic pole 3*c*. In this case, the magnet supporting segments 8*a*B may have heights arranged to suitably meet the interconnecting segment 8*b*B depending on a thickness (a dimension in a radial direction) of each magnet 7, thereby enabling the magnet 7 to be stably fixed in place.

Fourth Embodiment

FIGS. 18 to 21 show a rotor of a fourth embodiment according to the present invention. The same component parts as those of the previous embodiments bear like reference numerals to omit the redundant description.

With the rotor of the present embodiment, a magnet supporting ring 8C, formed of stainless steel or resin and the-shaped that are non-magnetic materials, includes a plurality of circumferentially and equidistantly spaced magnet supporting segments 8*a*C, operative to individually support the magnets 7C, respectively, and a plurality of interconnecting segments 8*b*C each disposed between adjacent magnet supporting segments 8*a*C for connecting the plurality of magnets 7C in an annular configuration.

The magnet supporting segments 8*a*C have outer surfaces 8*a*C1, operative to support the magnets 7C, respectively, which serve as abutment faces formed in flat configurations, respectively. Each of the magnet supporting segments 8*a*C has a length, corresponding to a longitudinal direction of each magnet 7C, which is set to be longer than the width (in dimension in a direction perpendicular to a circumferential direction of the supporting ring 8). In addition, the length of each magnet supporting segment 8*a*C may be selected to be greater than that of each magnet 7C but no need necessarily arises to be longer than the length of each magnet 7C because a needless increase in length merely results in waste of material. That is, the length of each magnet supporting segment 8*a*C may be selected to be shorter than that of each magnet 7C provided that the magnet supporting segment 8*a*C can stably support the magnet 7C. One example of each magnet supporting segment 8*a*C may have the substantially same shape and surface area as a shape and a surface area of an inner circumferential surface of each magnet 7C supported with the magnet supporting segment 8*a*C.

Figure 21:
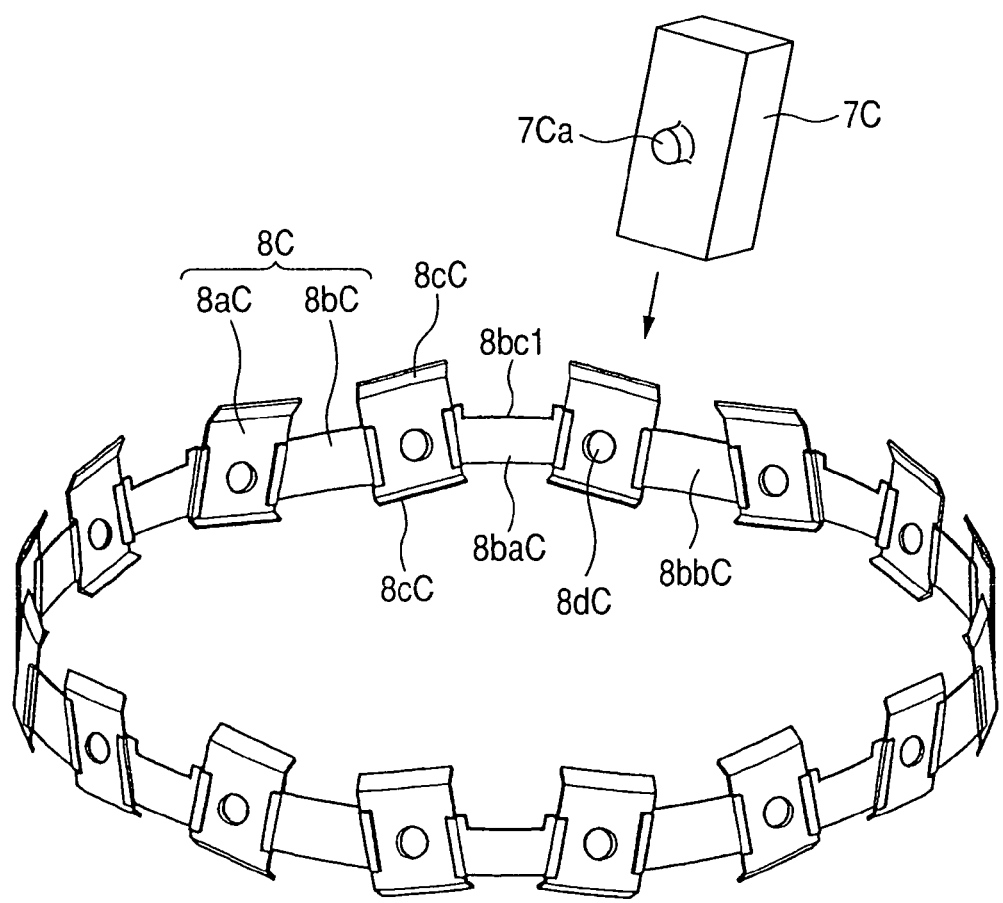
FIG. 21 is a perspective view showing a magnet support ring, used for the rotor shown in FIG. 18, for illustrating a structure of positioning and restricting means.

As shown in FIG. 21, each of the magnet supporting segments 8*a*C is placed with a given inclination with respect to each interconnecting segment 8*b*C in the circumferential direction of the supporting ring 8C so as to allow the adjacent magnet supporting segments 8*a*C to be inclined in opposite directions. That is, the plurality of magnet supporting segments 8*a*C is alternately inclined in the same direction in conformity to an assembling direction of the magnets 7C.

Further, each of the magnet supporting segments 8*a*C has both ends, oriented in a direction corresponding to a longitudinal length of each magnet 7C, which are formed with guide portions 8*c*C, respectively. The guide portions 8*c*C are bent radially inward of the supporting ring 8C so as to prevent corner portions of each magnet 7C from impinging against the claw-shaped magnetic pole 3*c* and distal ends of each interconnecting segment 8*b*C. That is, the guide portions 8*c*C serve to allow the magnet 7C to be easily inserted to a magnet accommodating space. Moreover, the guide portions 8*c*C have no need to be formed on the magnet supporting segment 8*a*C at both ends thereof and, in an alternative wherein a direction in which the magnet 7C is inserted is specified in one direction, one guide portion 8*c*C may be formed at either one of the ends in line with such one direction.

The interconnecting segments 8*b*C are placed in circular arc areas along inner peripheral walls of the claw-shaped magnetic poles 3*c*, respectively, to be positioned each between a stepped portion formed on one claw-shaped magnetic pole 3*c* at the inner peripheral wall thereof and a stepped portion formed on the other claw-shaped magnetic pole 3*c* at the inner peripheral wall thereof such that both of the stepped portions restrict the movement of each interconnecting segment 8*b*C in an axial direction. However, each interconnecting segment 8*b*C is structured such that each interconnecting segment 8*b*C can axially move by a slight extent so as not to create a clearance (air gap) between both of the boss portions 3*b*1 when the field iron cores 3A and 3B are assembled together.

As shown in FIG. 21, the interconnecting segments 8*b* include a first plurality of interconnecting segments 8*ba*C, each of which has axially facing one side (at an upper side in FIG. 21) formed with a concave portion 8*b*C1, and a second plurality of interconnecting segments 8*bb*C each of which has no concave portion 8*b*C1. The first and second pluralities of interconnecting segments 8*ba*C and 8*bb*C are alternately placed in a circumferential direction of the supporting ring 8C with the magnet supporting segment 8*a*C being sandwiched between the adjacent interconnecting segments 8*ba*C and 8*bb*C. The interconnecting segment 8*ba*C, having the concave portion 8*b*C1, has a width slightly smaller than that of the interconnecting segment 8*bb*C having no concave portion 8*b*C1. Thus, when the other side of the interconnecting segment 8*b*C in a widthwise direction is brought into abutting engagement with one stepped portion of the claw-shaped magnetic pole 3*c*, a slight amount of clearance is ensured between one side portion, having the concave portion 8*b*C1, and the other stepped portion of the claw-shaped magnetic pole 3*c*. Thus, the width of the interconnecting segment 8*b*C has no adverse affect on axial positions of the pair of field iron cores 3. This allows the boss portion 3*b*C1 of the field core 3A and the boss portion 3*b*C1 of the field core 3B to be reliably brought into abutting engagement with each other, thereby enabling a magnetic circuit to be formed between the both of the boss portions 3*b*C1 in the absence of an air gap.

Next, a method of assembling the magnets 7C will be described below.

Figure 20:
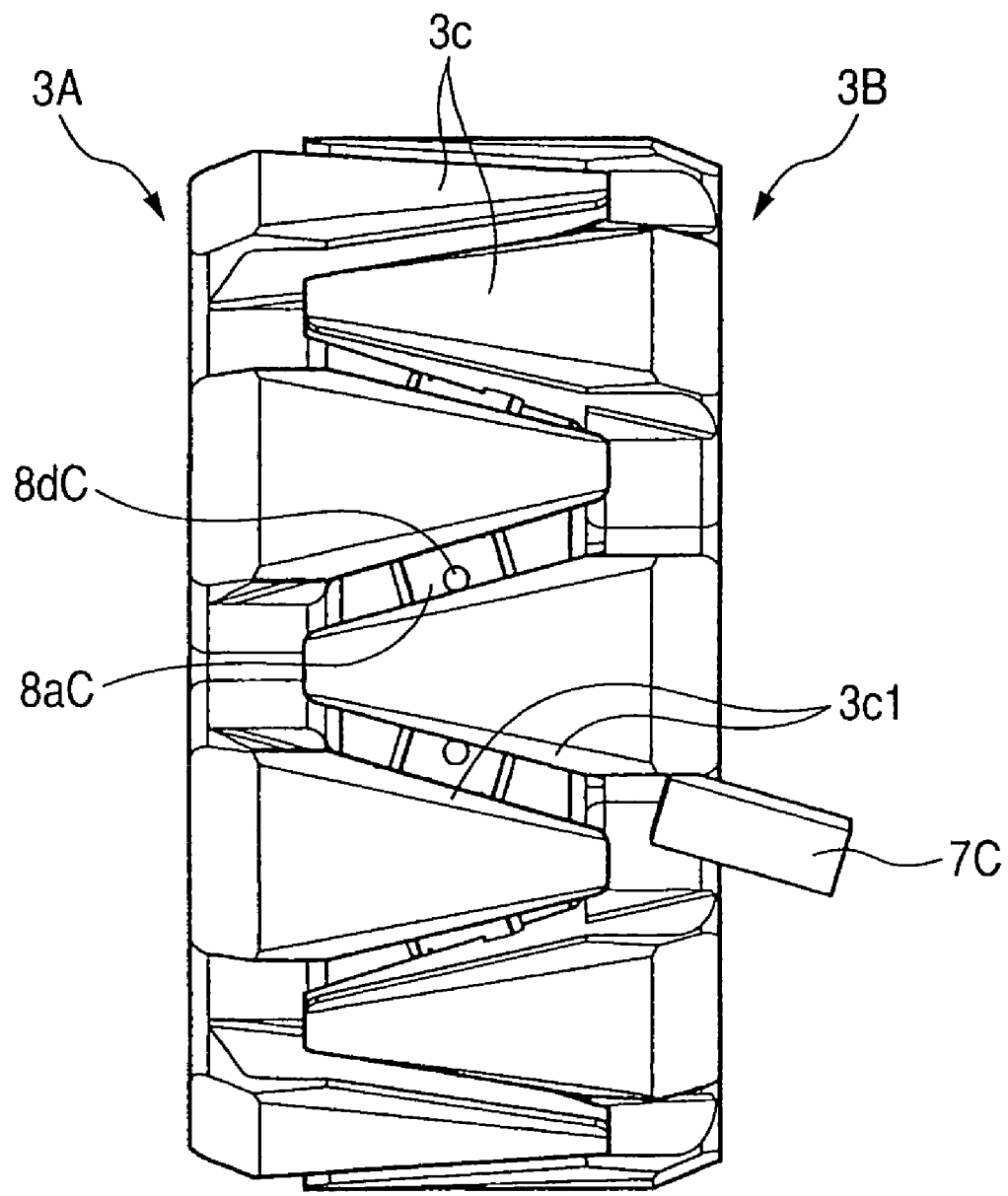
FIG. 20 is a side view of the field iron cores forming the rotor in FIG. 18.

The magnets 7 are not initially fixed to the supporting ring 8C and assembled separately from the supporting ring 8C. That is, the supporting ring 8C is preliminarily placed on inner peripheral sides of the claw-shaped magnetic poles 3*c* with the pair of field iron cores 3 being assembled before the magnets 7C are assembled. As shown in FIG. 20, thereafter, the magnets 7C are inserted to magnet accommodating spaces along their longitudinal directions for assembly. When this takes place, each of the magnets 7C is restricted from moving in longitudinal directions (directions in which the magnets 7 are inserted) with positional displacement restricting means.

Figure 22:
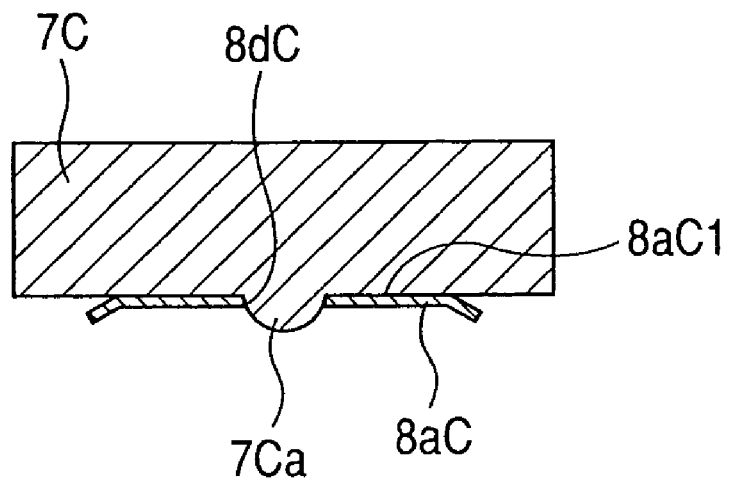
FIG. 22 is a cross-sectional view showing the structure of the positioning and restricting means.
Figure 23:
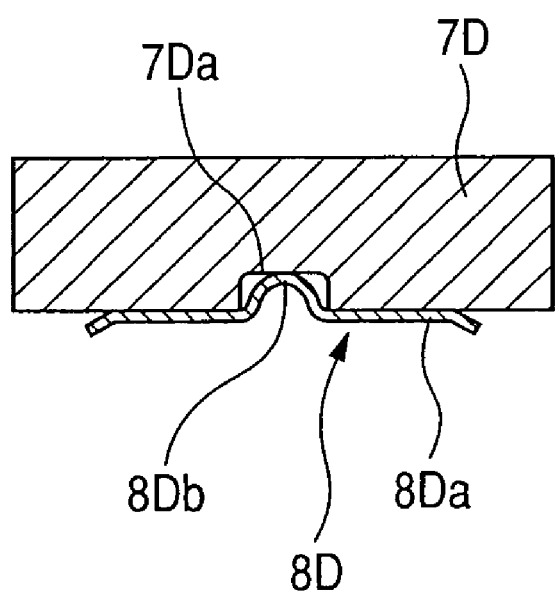
FIG. 23 is a cross-sectional view showing a modified formed of the positioning and restricting means shown in FIGS. 21 and 22.

As best shown in FIG. 22, the positional displacement restricting means takes the form of a structure composed of a bore portion 8*dc*, formed in a magnet supporting portion 8*a*C of the magnet supporting ring 8C, and a protruding portion 7Ca formed on each magnet 7C at a bottom wall thereof. An alternative is shown in FIG. 23, wherein each magnet 7D has a bottom wall inwardly formed with a concave portion 7Da whereas a magnet supporting ring 8D has a magnet supporting segment 8Da formed with upwardly protruding protrusion 8Db available to be brought into fitting engagement with the concave portion 7Da.

Turning back to FIGS. 19 to 21, further, each magnet 7C is inserted to a magnet accommodating space defined between the holding portions (flange portions) 3*c*1 of adjacent claw-shaped magnet poles 3*c* and the magnet supporting segment 8*a*C of the magnet supporting ring 8C with a slight degree of tightening margin with respect to a radial direction. That is, with each magnet 7C having an inner peripheral wall supported in abutting engagement with the magnet supporting segment 8*a*C, both shoulder portions of each magnet 7C on an outer peripheral side thereof are pressed against inner walls of the flange portions 3*c*1 formed on the adjacent claw-shaped magnetic poles, thereby restricting the movement of each magnet 7C in a centrifugal outward direction (radially outward).

Figure 24:
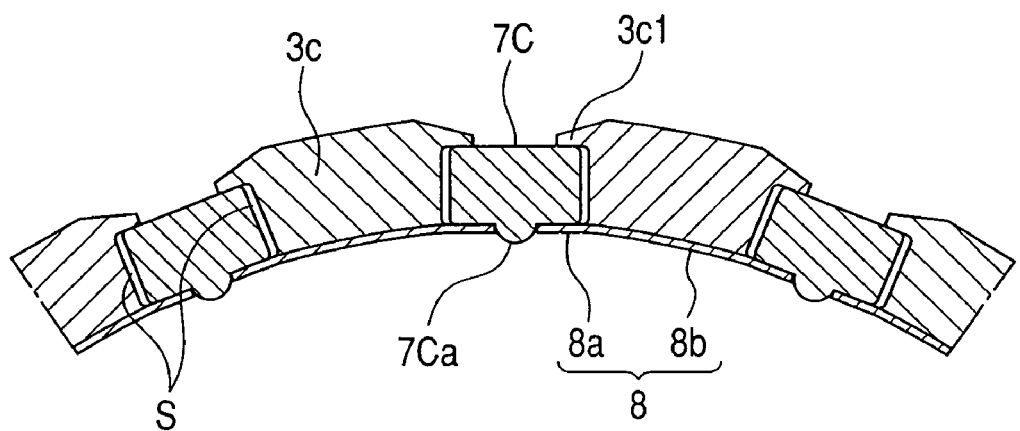
FIG. 24 is a fragmentary cross-sectional view of the magnet support ring of the embodiment shown in FIGS. 21 and 22 showing the relationship between claw-shaped magnetic poles, permanent magnets and the magnet support ring.
Figure 25:
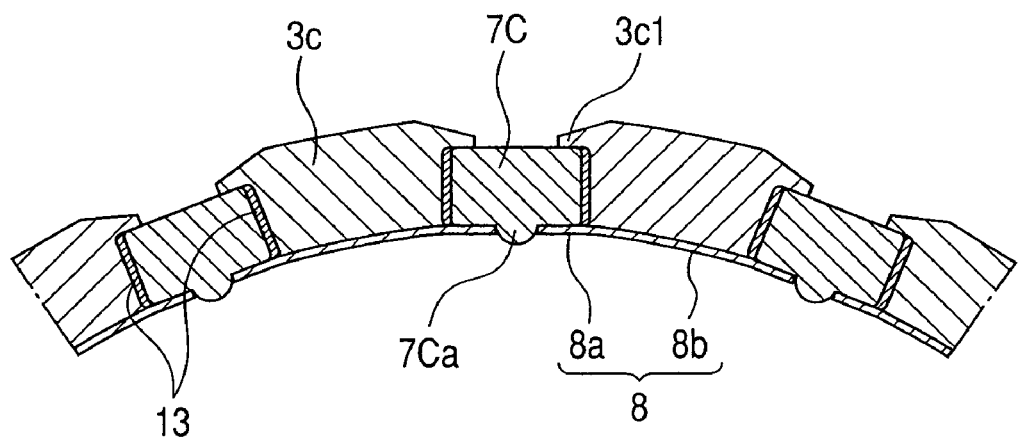
FIG. 25 is a fragmentary cross-sectional view of the magnet support ring of the embodiment shown in FIGS. 21 and 22 showing the relationship between the claw-shaped magnetic poles, the permanent magnets and the magnet support ring with impregnant being filled in each clearance between a sidewall of each permanent magnet and a sidewall of an adjacent claw-shaped magnetic pole.

Furthermore, each magnet 7C has a structure that is slightly smaller than a circumferential dimension between the sidewalls of the claw-shaped magnetic poles 3*c* placed adjacent to each other in the circumferential direction such that each magnet 7C can be naturally inserted to the magnet accommodating space. Therefore, as shown in FIG. 24, there are clearances S each between the sidewall of the magnet 7C on a side facing in the circumferential direction and the sidewall of each claw-shaped magnetic pole 3*c*. To fill such clearance S, as shown in FIG. 25, impregnant 13 such as epoxy resin or the-shaped may be filled in the clearances S. This enables the impregnant 13 to fixedly retain each magnet 7C such that each magnet 7C can be held in a further reliable manner.

Advantageous Effect of Fourth Embodiment

The magnet accommodating space, to which each of the magnets 7C is inserted, has a dimension and a position that are largely influenced with processing precision and assembling precision of the claw-shaped magnetic poles 3*c* constituting the field iron cores 3. In other words, if variations occur in processing precision and assembling precision of the claw-shaped magnetic poles 3*c*, then, there is a risk of variation in different dimensions of the magnet accommodating spaced located at plural positions. On the contrary, with the rotor 1C of the present embodiment, none of the plural magnets 7C is fixedly secured to the magnet supporting ring 8C in advance. Therefore, the magnet supporting ring 8C is placed on the claw-shaped magnetic poles 3*c* at the inner peripheral walls thereof and, thereafter, the plural magnets 7C can be inserted to the individual magnet accommodating spaces for assembly. Therefore, even if the variation exits in processing precision and assembling precision of the claw-shaped magnetic poles 3*c*, the plural magnets 7C can be individually inserted to the magnet accommodating spaces, respectively, for assembly.

With such a structure set forth above, no undue force is applied to each magnet 7C, making it possible to prevent damage to each magnet 7C during assembling operation or in use. In contrast to the related art (see Patent Publication 1) wherein the plural magnets 7 are preliminarily fixed to the magnet supporting ring, the present embodiment has no need to structure the magnet assembly. Thus, no need arises for the positional relationship between the plural magnets 7C and the magnetic supporting ring 8C to be positioned with increased precision while no need arises to increase part precision and assembling precision of the field iron cores 3, resulting in a reduction in cost by that degree.

Further, the magnets 7C of the present embodiment, the positional deviation restricting means of the present invention has a capability of preventing the occurrence of the positional deviation of each magnet 7C in the longitudinal direction (in a direction in which each magnet 7C is assembled) with respect to the magnet supporting ring 8C. That is, as shown in FIG. 22, each magnet 7C has the protruding portion 7Ca adapted to be brought into fitting engagement with the positioning hole (apertured portion) 8*d*C formed on the magnet supporting segment 8*a*C, thereby enabling each magnet 7C to be positioned the magnet supporting segment 8*a*C in the longitudinal direction. This reliably prevents each magnet 7C from moving due to engine vibrations, etc.

Further, the magnets 7C are inserted to the spaces each between the flange portion 3*c*1 of each claw-shaped magnetic pole 3*c* and the magnet supporting segment 8C of the supporting ring 8C in a radial dimension with a slight degree of tightening margin. That is, each of the magnets 7 is held in abutting engagement with both the flange portion 3*c*1 of each claw-shaped magnetic pole 3*c* and the magnet supporting segment 8*a*C of the supporting ring 8C. This ensures the magnet 7C to be fixed in a more reliable manner against centrifugal stress.

Further, each of the magnets 7C is inserted to the space between the circumferentially adjacent claw-shaped magnetic poles 3*c* with slight amounts of clearances S (see FIG. 24).

Filling the space between the sidewall of each magnet 7C and the sidewall of each claw-shaped magnetic pole 3*c* with the impregnant 13 enables the prevention of movement of each magnet 7C in a rotational direction of the rotor 1C.

Fifth Embodiment

Figure 26:
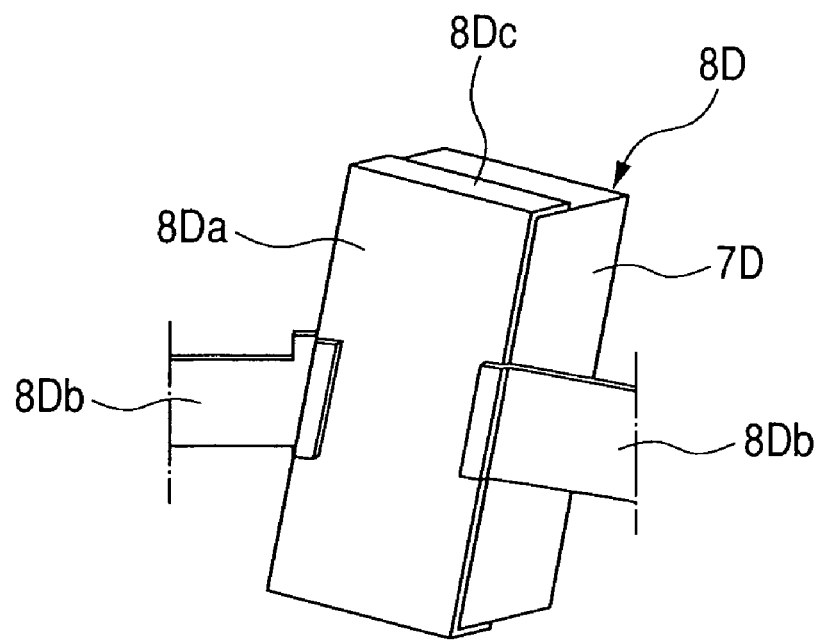
FIG. 26 is a perspective view of a rotor of another embodiment according to the present invention for illustrating a structure of positioning and restricting means.

FIG. 26 is a perspective view showing a structure of positional deviation restricting means according to the present invention.

With the present embodiment, a magnetic supporting ring 8D includes a plurality of circumferentially and equidistantly spaced magnet supporting segments 8Da and a plurality of circumferentially and equidistantly spaced interconnecting segments 8Db each interposed between the adjacent magnet supporting segments 8Da as shown in FIG. 26. Each of the magnet supporting segments 8Da has axial ends formed with engaging stop segments 8Dc that are bent radially outward to serve as the positional deviation restricting means.

Figure 27:
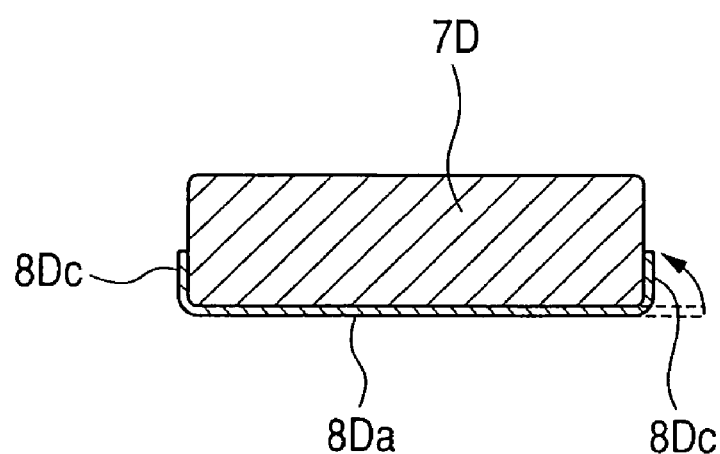
FIG. 27 is a cross-sectional view showing structure of positioning and restricting means.

As shown in FIG. 27, one of the pair of engaging stop segments 8Dc is preliminarily bent in advance to allow the magnet 7D to be inserted to and assembled to the magnet inserting space, after which the other one of the pair of engaging stop segments 8Dc is folded such that the magnet 7D can be grasped in a longitudinal direction. With such an assembling sequence, no stress is applied to the engaging stop segments 8Dc during an operation in which the magnet 7D is inserted to the magnet inserting space. Therefore, no deterioration takes place in function of the engaging stop segments 8Dc to retain the magnet 7D, resulting in increased reliability of the engaging stop segments 8Dc.

Sixth Embodiment

Figure 28:
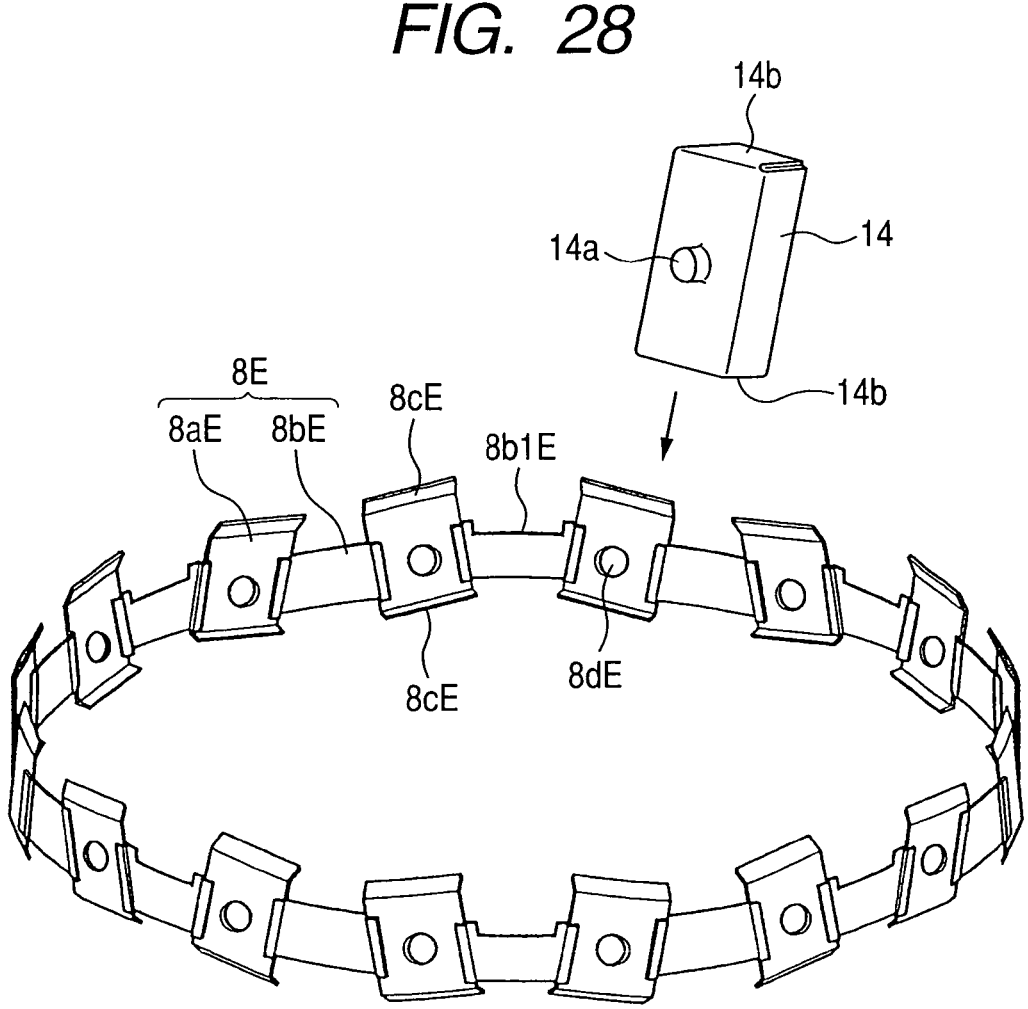
FIG. 28 is a perspective view showing a magnet support ring, used for the rotor shown in FIG. 18, for illustrating another structure of positioning and restricting means and a magnet case.

FIG. 28 is a perspective view showing a magnet support ring 8E and a magnet case 14 for internally accommodating therein a magnet 7E. With the present embodiment, as shown in FIG. 28, the magnet 7E is protected by the magnet case 14 and the magnet support ring 8E includes positional displacement restricting means including a radially inwardly extending protrusion 14a formed on a bottom wall of the magnet case 14 at a central area thereof, and a apertured portion 8dE formed on each of magnet supporting segments 8aE of the magnet support ring 8E.

Figure 29:
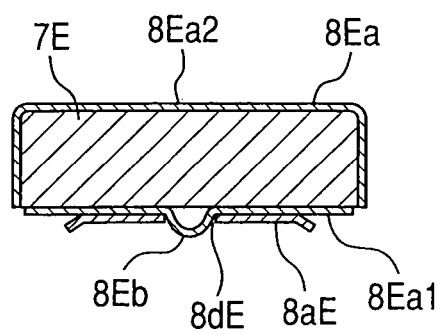
FIG. 29 is a cross-sectional view showing the structure of the positioning and restricting means shown in FIG. 28.

The magnet case 14 is made of non-magnetic material such as, for instance, stainless steel or resin and formed in a box-shaped configuration to internally accommodate therein the magnet 7E such that a whole (apertured portion) surface of the magnet 7E is covered. As shown in FIG. 29, the magnet case 14 is positioned in a fixed place. To this end, the protrusion 14a of the magnet case 14 is fitted to the hole (apertured portion) 8dE formed on the magnet supporting segment 8aE such that the magnet case 14 is positioned with respect to the magnet supporting segment 8aE. This results in a capability of restricting a positional displacement of the magnet 7E in a longitudinal direction (axial direction) thereof with respect to the magnet supporting segment 8aE.

Figure 30:
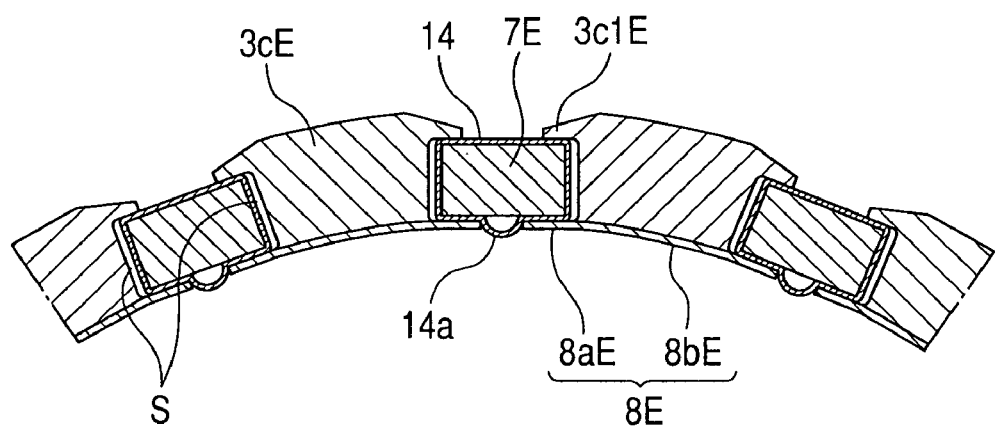
FIG. 30 is a fragmentary cross-sectional view of the magnet support ring of the embodiment shown in FIGS. 28 and 29 showing the relationship between the claw-shaped magnetic poles, the permanent magnets enveloped in the magnet cases, respectively, and the magnet support ring.
Figure 31:
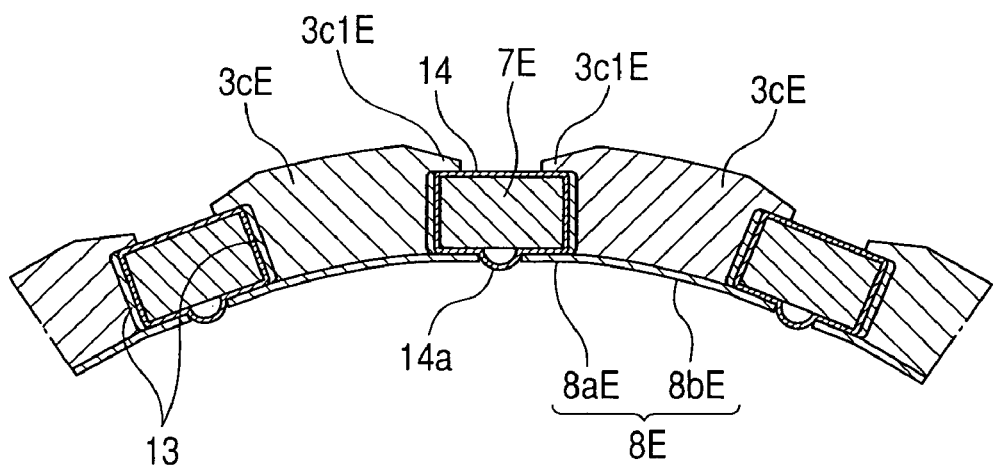
FIG. 31 is a fragmentary cross-sectional view of the magnet support ring of the embodiment shown in FIGS. 28 and 29 showing the relationship between the claw-shaped magnetic poles, the permanent magnets enveloped in the magnet cases, respectively, and the magnet support ring with impregnant being filled in each clearance between a sidewall of each permanent magnet and a sidewall of an adjacent claw-shaped magnetic pole.

Further, the magnet case 14 is inserted to the magnet accommodating space with a slight tightening margin being provided in a radial spacing between a holding portion 3cE (see FIG. 30) of each claw-shaped magnetic pole 3cE and the magnet supporting segment 8aE of the supporting ring 8E. That is, as shown in FIG. 30, the magnet case 14 has an inner peripheral surface portion 8Ea1, supported with the magnet supporting segment 8aE, and an outer peripheral surface portion 8Ea2 having both shoulder portions protecting an outer circumferential area of the magnet 7E. Thus, the magnet case 14 is assembled to the magnet support ring 8E such that both the shoulder portions of the magnet case 14 are pressed against inner circumferential walls of flange portions 3c1E of the claw-shaped magnet poles 3cE.

Figure 14:
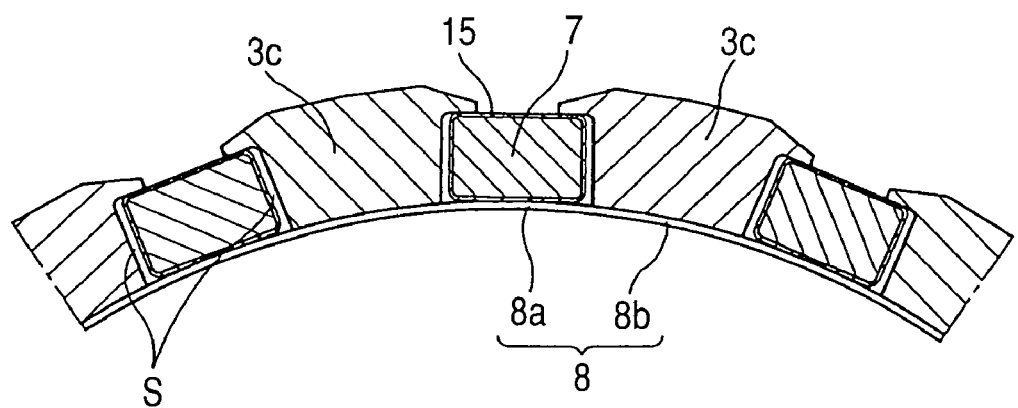
FIG. 14 is a fragmentary cross-sectional view showing the relationship between claw-shaped magnetic poles, permanent magnets and a magnet support ring forming a rotor of another embodiment according to the present invention with impregnant being filled in each clearance between a sidewall of each permanent magnet and a sidewall of an adjacent claw-shaped magnetic pole.

Further, the magnet case 14 is formed in a structure having a circumferential dimension slightly smaller than that between the sidewalls of the claw-shaped magnetic poles 3cE, placed adjacent to each other in the circumferential direction, such that the magnet case 14 can be reasonably inserted to the magnet accommodating space. Therefore, as shown in FIG. 30, there are clearances S each between the sidewall of the magnet 7E on a side facing in the circumferential direction and the sidewall of each claw-shaped magnetic pole 3c. As shown in FIG. 14, such a clearance S can be filled with impregnant 13 such as epoxy resin.

The magnet 7E of the present embodiment is accommodated in the magnet case 14 formed in the box-shaped configuration. This results in an increase of strength against centrifugal stress acting on the magnet 8Ea. Even in the event of damage to the magnet 7E, it becomes possible to prevent fragments of the magnet 7E from scattering.

Further, the present embodiment takes the form of a structure wherein the protrusion 14a, provided on the magnet case 14, is fitted to the hole (apertured portion)s 8dE formed in the magnet supporting segment 8aE. Thus, no need arises for machining convexed portions or concaved portions of the magnet 7E per se. In addition, with the structure of the fourth embodiment described above, the magnet 7E is provided with the protrusion 7Ca or the concaved portion 7Da (see FIGS. 21 to 23) that are fitted to the apertured portion 8dC or the protrusion 8dB of the magnet supporting segment 8aC. With such a structure, when permitting the relevant parts to be brought into fitting engagement, stresses act on the protrusion 7Ca and the concaved portion 7Da of the magnets 7C and 7D, causing a risk of damage to the parts (corner areas of the protrusion 7Ca and the concaved portion 7Da) of the magnets 7C and 7D. However, with the present embodiment, there is no need to worry and no risk takes place for the magnet to be damaged during assembly.

Seventh Embodiment

Figure 32:
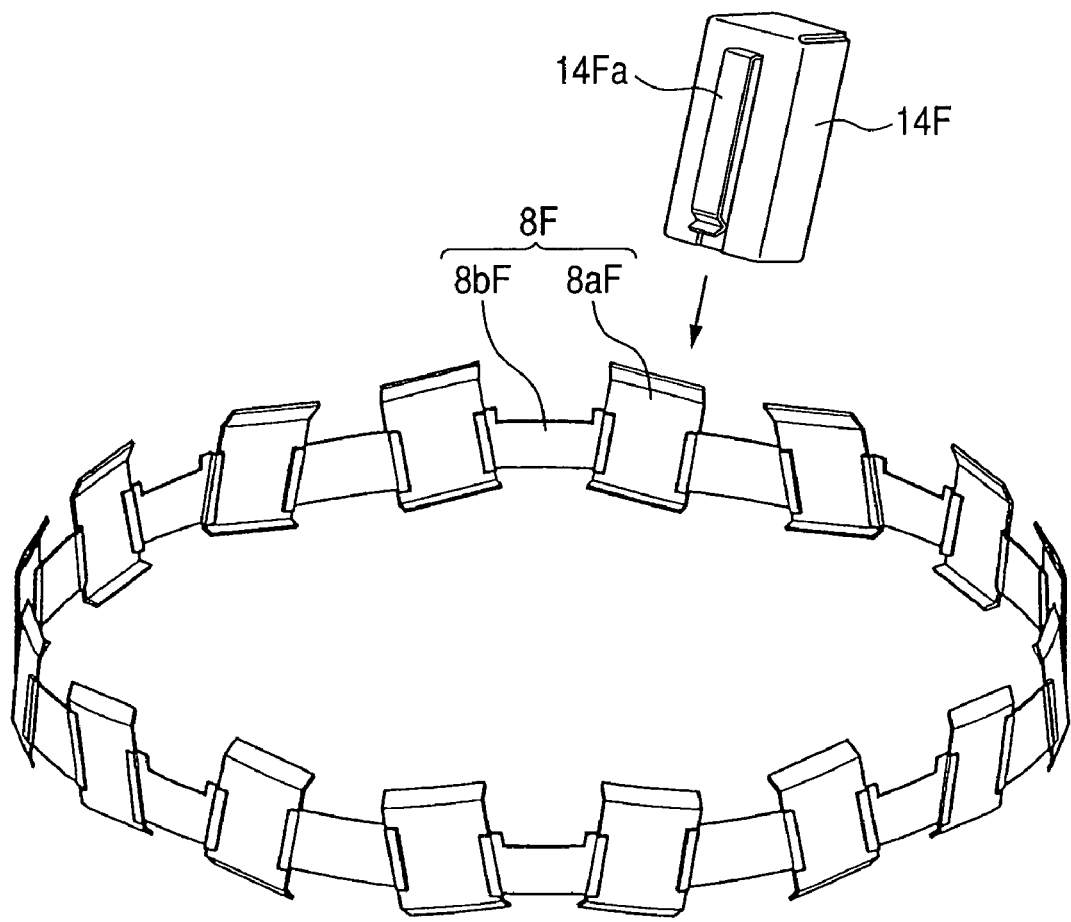
FIG. 32 is a perspective view showing another structure of a magnet support ring and a magnet case incorporating positioning and restricting means.
Figure 33:
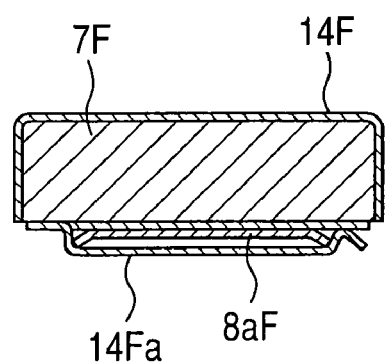
FIG. 33 is a cross-sectional view showing the structure of the positioning and restricting means shown in FIG. 32.

FIG. 32 is a perspective view showing a magnet support ring 8F and a magnet case 14F for internally accommodating therein a magnet 7F. With the present embodiment, as shown in FIG. 32, positional displacement restricting means includes a snap fit 14Fa formed on a bottom wall of the magnet case 14F at a central area thereof. The snap fit 14Fa is tightening means utilizing elasticity. As shown in FIG. 33, the snap fit 14Fa is moved in a longitudinal direction (left and right direction as viewed in FIG. 33) to be brought into fitting engagement with a magnet supporting segment 8aF of the magnet support ring 8F. This restricts a positional displacement of the magnet 7F with respect to the magnet supporting segment 8aF of the magnet support ring 8F.

Even with the structure of the present embodiment, —shaped the sixth embodiment described above with reference to FIGS. 28 to 31, no need arises for corner areas of the magnet 7E to be formed with the convexed portion 7Ca (see FIG. 21) and the concave portion 7Da (see FIG. 23). Thus, no risk takes place to cause damage to a partial area (especially at the corner areas, etc., of the convexed portion or the concave portion) of the magnet 7F.

With the structure shown in FIG. 32, although the magnet case 14F has the snap fit 14Fa, an alternative may be arranged such that the magnet supporting segment 8aF of the magnet support ring 8F may be provided with a snap fit and the magnet case 14F may be provided with a fitting hole (apertured portion) to which the snap fit can be fitted such that a positional displacement of the magnet 7F can be restricted.

Eighth Embodiment

Figure 34:
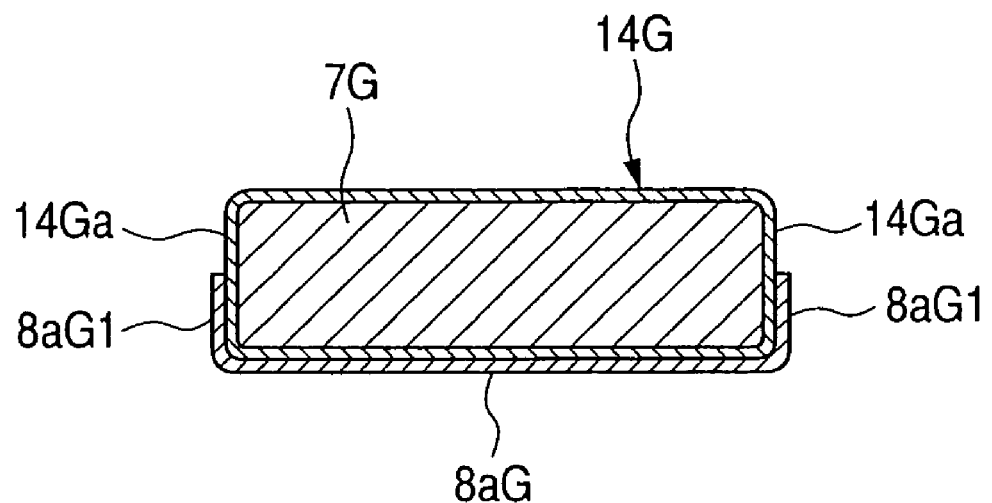
FIG. 34 is a cross-sectional view showing another structure of positioning and restricting means.

FIG. 34 is a cross-sectional view showing a structure of positional displacement restricting means of an eighth embodiment according to the present invention.

Like the structure of the fifth embodiment described above with reference to FIGS. 26 and 27, the positional displacement restricting means of the embodiment includes a magnet supporting segment 8aG, forming part of a magnet support ring (not shown), has both ends formed with engaging stop segments 8aG1, respectively. The engaging stop segments 8aG1 are folded toward end faces (serving as end plate portions of the present invention) 14Ga of a magnet case 14G so as to grasp the magnet case 8G along a longitudinal direction thereof.

With the fifth embodiment shown in FIGS. 26 and 27, the magnet case 8D has been illustrated with reference in the absence of the magnet case 14G, i.e., the structure wherein the magnet 7D is grasped with the pair of the engaging stop segments 8Dc. Even with the structure shown in FIG. 34 wherein the magnet 7G is accommodated in the magnet case 14G, the positional displacement restricting means, including the pair of the engaging stop segments 8Dc described above with reference to the fifth embodiment, can be applied to the magnet supporting segment 8aG.

Ninth Embodiment

Figure 35:
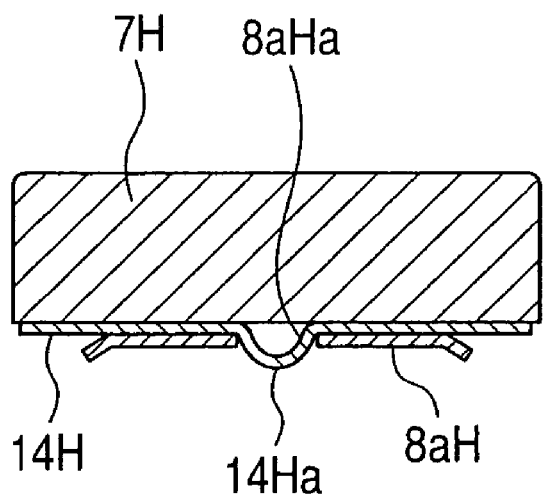
FIG. 35 is a cross-sectional view showing still another structure of positioning and restricting means.

FIG. 35 is a cross-sectional view showing a structure of positional displacement restricting means of a ninth embodiment according to the present invention.

With the sixth to seventh embodiments, the magnet cases 14, 14F and 14G are formed in the box-shaped configurations each surrounding an entire surface of the magnet. In an alternative, the positional displacement restricting means may include, for instance, a nearly plate-shaped magnet case 14H, as shown in FIG. 35, which protects at least an inner peripheral surface of a magnet 7H. However, with the magnet case 14H formed in the nearly plate-shaped configuration, the magnet 7H needs to be adhered to the magnet case 14H using adhesive or the like.

As shown in FIG. 35, the positional displacement restricting means of the present embodiment may include a convexed portion 14Ha formed on the magnet case 14H so as to protrude downward (i.e., radially inward) and a apertured portion 8aHa formed in a magnet supporting segment 8aH. With such a structure, the convexed portion 14Ha of the magnet case 14H is brought into fitting engagement with the apertured portion 8aHa of the magnet supporting segment 8aH (like the structure of the sixth embodiment), thereby providing a function of the positional displacement restricting means. In an alternative, the magnet case 14 may be provided with a snap fit having the same structure as that of the magnet case 14F of the seventh embodiment shown in FIGS. 32 and 33.

[Modified Form]

Although the fourth embodiment has been described above with reference to a sequence in which the magnet support ring 8C is preliminarily disposed on the claw-shaped magnetic poles 3c on the inner peripheral side thereof after which the magnet 7C is inserted to the magnet accommodating space in the longitudinal direction of the magnet 7C per se for assembly, the fourth embodiment may be modified in sequence. That is, the magnet support ring 8C and the magnets 7C can be unitarily assembled to the field iron cores 3 with positional displacements of the magnets 7 in the longitudinal directions thereof restricted with respect to the magnet supporting segments 8aC. This similarly applies to the fifth embodiment shown in FIGS. 26 and 27. That is, before placing the magnet support ring on the claw-shaped magnetic poles 3C on the inner peripheral sides thereof, the magnet 7D is set to the magnetic supporting segment after which the pair of engaging stop segments 8Dc are folded to grasp the magnet 7D. Under such a condition, the magnet support ring and the magnets 7D can be assembled to the field iron cores 3 in a unitary structure.

Even with structures including the magnet cases 14, 14F, 14G and 14H, the magnet support ring and the magnet case can be assembled to the field iron cores 3 in a unitary structure with each of these magnet cases being positioned in the longitudinal direction with respect to the magnet supporting segment.

While the fourth embodiment has been described with reference to the structure wherein the magnet support ring 8C has the magnet supporting segments 8aC each of which is formed in the flat surface, the magnet supporting segment 8aC may have the same curvature as that of the interconnecting segment 8bC. In this case, clearances are created between the magnet 7C, or the magnet case 14 (see FIGS. 28 and 29), and the magnet supporting segment 8aC or 8aE. Impregnant such as epoxy resin or the-shaped may be filled in the clearances. This enables the impregnant to fixedly retain each magnet such that each magnet or each magnet case can be held in a further stable manner.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A rotor for an electric rotary machine comprising:
a pair of field iron cores fixed to a rotary shaft and having pluralities of claw-shaped magnetic poles meshing with each other with a given distance between circumferentially adjacent claw-shaped magnetic poles in a circumferential direction of the rotor, each of the claw-shaped magnetic poles having circumferentially facing side walls with outer circumferential portions formed with engaging stop portions circumferentially protruding in flanged shapes, respectively;
a field winding wound on the pair of field iron cores;
a plurality of permanent magnets each disposed between sidewalls of the circumferentially adjacent claw-shaped magnetic poles and magnetized in a direction to reduce leakage of magnetic flux between the circumferentially adjacent claw-shaped magnetic poles; and
a non-magnetic magnet support ring configured to support the permanent magnets such that the permanent magnets are movable with respect to the magnet support ring, the magnet support ring being disposed on the plurality of permanent magnets on inner peripheral sides thereof;
the magnet support ring including support means for supporting the permanent magnets to allow each permanent magnet to be disposed between the sidewalls of the circumferentially adjacent claw-shaped magnetic poles while permitting the magnet support ring to be disposed on the claw-shaped magnetic poles on the inner peripheral sides thereof under which the inner peripheral sides of the permanent magnets are supported with the magnet support ring so as to allow the engaging stop portions of the circumferentially adjacent claw-shaped magnetic poles to restrict each permanent magnet from moving radially outward; and positional displacement restricting means provided on the magnet support ring for restricting a positional displacement of each permanent magnet with respect to the magnet support ring in a longitudinal direction thereof along the sidewalls of each claw-shaped magnetic pole, wherein the positional displacement restricting means includes one of a concaved portion and an apertured portion formed on at least one of the magnet support ring and each permanent magnet and a convexed portion formed on the other one of the magnet support ring and each permanent magnet, the convexed portion being held in fitting engagement with the one of the concaved portion and the apertured portion.

2. A rotor for an electric rotary machine comprising:
a pair of field iron cores fixed to a rotary shaft and having pluralities of claw-shaped magnetic poles meshing with each other with a given distance between circumferentially adjacent claw-shaped magnetic poles in a circumferential direction of the rotor, each of the claw-shaped magnetic poles having circumferentially facing side walls with outer circumferential portions formed with engaging stop portions circumferentially protruding in flanged shapes, respectively;
a field winding wound on the pair of field iron cores;
a plurality of permanent magnets each disposed between sidewalls of the circumferentially adjacent claw-shaped magnetic poles and magnetized in a direction to reduce leakage of magnetic flux between the circumferentially adjacent claw-shaped magnetic poles; and
a non-magnetic magnet support ring configured to support the permanent magnets such that the permanent magnets are movable with respect to the magnet support ring, the magnet support ring being disposed on the plurality of permanent magnets on inner peripheral sides thereof;
the magnet support ring including support means for supporting the permanent magnets to allow each permanent magnet to be disposed between the sidewalls of the circumferentially adjacent claw-shaped magnetic poles while permitting the magnet support ring to be disposed on the claw-shaped magnetic poles on the inner peripheral sides thereof under which the inner peripheral sides of the permanent magnets are supported with the magnet support ring so as to allow the engaging stop portions of the circumferentially adjacent claw-shaped magnetic poles to restrict each permanent magnet from moving radially outward; and
positional displacement restricting means provided on the magnet support ring for restricting a positional displacement of each permanent magnet with respect to the magnet support ring in a longitudinal direction thereof along the sidewalls of each claw-shaped magnetic pole, wherein
 each of the permanent magnets includes a non-magnetic magnet case protecting at least an inner peripheral surface of each permanent magnet;
 the magnet support ring includes an annular body made of non-magnetic material for supporting the permanent magnets on the inner peripheral sides thereof via the magnet case;
 the magnet case has a pair of end plate portions held in contact with both axial ends of each permanent magnet for protecting the both axial ends of each permanent magnet in the longitudinal direction thereof; and
 the magnet support ring has a plurality of circumferentially and equidistantly spaced magnet supporting segments to support the permanent magnets, respectively, and each of the magnet supporting segments has both axial ends, aligned along the longitudinal direction of each permanent magnet, at which engaging stop segments are folded in pairs toward the end plate portions of the magnet case to grasp the magnet case along a longitudinal direction thereof to act as the positional displacement restricting means.

3. A rotor for an electric rotary machine comprising:
a pair of field iron cores fixed to a rotary shaft and having pluralities of claw-shaped magnetic poles meshing with each other with a given distance between circumferentially adjacent claw-shaped magnetic poles circumferential direction of the rotor, each of the claw-shaped magnetic poles having circumferentially facing side walls with outer circumferential portions formed with engaging stop portions circumferentially protruding in flanged shapes, respectively;
a field winding wound on the pair of field iron cores;
a plurality of permanent magnets each disposed between sidewalls of the circumferentially adjacent claw-shaped magnetic poles and magnetized in a direction to reduce leakage of magnetic flux between the circumferentially adjacent claw-shaped magnetic poles; and
a non-magnetic support ring configured to support the permanent magnets such that the permanent magnets are movable with respect to magnet support ring, the magnet support ring being disposed on the plurality of permanent magnets on inner peripheral sides thereof;
the magnet support ring including support means for supporting the permanent magnets to allow each permanent magnet to be disposed between the sidewalls of the circumferentially adjacent claw-shaped magnetic poles while permitting the magnet support ring to be disposed on the claw-shaped magnetic poles on the inner peripheral sides thereof under which the inner peripheral sides of the permanent magnets are supported with the magnet support ring so as to allow the engaging stop portions of the circumferentially adjacent claw-shaped magnetic poles to restrict each permanent magnet from moving radially outward; and
positional displacement restricting means provided on the magnet support ring for restricting a positional displacement of each permanent magnet with respect to the magnet support ring in a longitudinal direction thereof along the sidewall of each claw-shaped magnetic pole, wherein
 each of the permanent magnets includes a non-magnetic magnet case protecting at least an inner peripheral surface of each permanent magnet;
 the magnet support ring includes an annular body made of non-magnetic material for supporting the permanent magnets on the inner peripheral sides thereof via the magnet case; and
 the positional displacement restricting means includes a snap fit formed on the magnet case to engage the magnet support ring along the longitudinal direction of each permanent magnet.

* * * * *